(12) United States Patent
Breiling et al.

(10) Patent No.: US 9,136,982 B2
(45) Date of Patent: Sep. 15, 2015

(54) TRANSMITTER AND RECEIVER USING NON-ADJACENT COMPONENT INTERLEAVING

(71) Applicant: Fraunhofer-Gesellschaft zur Foerderung der angewandten Forschung e.V., Munich (DE)

(72) Inventors: Marco Breiling, Erlangen (DE); Amaia A. Gomez, Erlangen (DE); Holger Stadali, Erlangen (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/099,359

(22) Filed: Dec. 6, 2013

(65) Prior Publication Data

US 2014/0119473 A1 May 1, 2014

Related U.S. Application Data

(63) Continuation of application No. PCT/EP2012/060895, filed on Jun. 8, 2012.

(30) Foreign Application Priority Data

Jun. 16, 2011 (EP) .................................... 11170186
Jun. 16, 2011 (EP) .................................... 11181660

(51) Int. Cl.
*H04L 27/00* (2006.01)
*H04L 1/00* (2006.01)
(Continued)

(52) U.S. Cl.
CPC .............. *H04L 1/0071* (2013.01); *H04L 27/26* (2013.01); *H04L 27/34* (2013.01)

(58) Field of Classification Search
CPC ........ H04L 1/0071; H04L 27/26; H04L 27/34
USPC .......................................... 375/295, 316, 324
See application file for complete search history.

(56) References Cited

U.S. PATENT DOCUMENTS

| 7,675,985 | B1 | 3/2010 | Watson | |
|---|---|---|---|---|
| 2007/0135049 | A1* | 6/2007 | Yoshii et al. | 455/42 |

(Continued)

OTHER PUBLICATIONS

Stott, Rotated Constellations, BBC Research, DTG DVB-T2 Implementer's Seminar, Oct. 8, 2008, pp. 1-19.*

(Continued)

*Primary Examiner* — Freshteh N Aghdam
(74) *Attorney, Agent, or Firm* — Allen J. Moss; Squire Patton Boggs (US) LLP

(57) ABSTRACT

A transmitter for transmitting information has a mapper for generating a plurality of mapped symbols, each mapped symbol having a first component and a second component, one of the first and second components being an in-phase component and the other of the first and second components being a quadrature component from a codeword; and a component interleaver for generating a plurality of interleaving units to be transmitted in a time sequence, the plurality of interleaving units consisting of at least three different interleaving units, wherein an interleaving unit has a plurality of pairs of first and second components, wherein the component interleaver is configured for assigning all first components and all second components of a codeword to the plurality of interleaving units in accordance with an interleaving rule, so that an I component of an mapped symbol and the Q component of the same mapped symbol are never assigned to one and the same interleaving unit, but to two different interleaving units.

17 Claims, 19 Drawing Sheets

(51) Int. Cl.
*H04L 27/34* (2006.01)
*H04L 27/26* (2006.01)

(56) References Cited

U.S. PATENT DOCUMENTS

2012/0002739 A1* 1/2012 Peron .................. 375/260
2012/0106673 A1* 5/2012 Taylor et al. .......... 375/295

OTHER PUBLICATIONS

DVB Organization: "TM-NGH068r1__KBS__1.pdf," DVB, Digital Video Broadcasting, c/o EBU-17A Ancienne Route—CH-1218 Grance Saconnex, Geneva, Switzerland, Mar. 20, 2010, XP017832090.

DVB Organization: "TM-NGH1172__Details__TI__FhG.ppt," DVB, Digital Video Broadcasting, c/o EBU-17A Ancienne Route—CH-1218 Grance Saconnex, Geneva, Switzerland, Sep. 22, 2011, XP017836692.

DVB Organization: "RCComponentSeparation.ppt," DVB, Digital Video Broadcasting, c/o EBU-17A Ancienne Route—CH-1218 Grance Saconnex, Geneva, Switzerland, Dec. 8, 2011, XP017838253.

Stott, Jonathan; "Rotated Constellations," DTG DVB-T2 Implementers' Seminar, Oct. 9, 2008, London, England, Retrieved from the Internet: URL:http://www/dtg/org/uk/dtg/t2docs/RotCon__Jonathon__Stott__BBC.pdf [retrieved on Aug. 17, 2012], p. 11.

DVB Organization: "T2-0447-DVB-T2 Implementation Guidelines 0 3 0.doc," DVB, Digital Video Broadcasting, c/o EBU-17A Ancienne Route, CH-1218 Grand Saconnex, Geneva, Switzerland, Jul. 11, 2008, XP017817728, Paragraphs 8.1.3-8.1.5.

DVB Organization: "TM-NGH068rl KBS 1pdf," DVB, Digital Video Broadcasting, c/o EBU-17A Ancienne Route—CH-1218 Grand Saconnex, Geneva, Switzerland, Jul. 11, 2008, XP017817728, paragraphs 8.1.3-8.1.5.

DVB Organization: "TM-NGH1172 Details TI FhG.ppt," DVB, Digital Video Broadcasting, c/o EBU-17A Ancienne Route—CH-1218 Grand Saconnex, Geneva, Switzerland, Sep. 22, 2011, XP017836692, slides 22-27.

DVB Organization: "RCComponentSeparation.ppt," DVB, Digital Video Broadcasting, c/o EBU-17A Ancienne Route—CH-1218 Grand Saconnex, Geneva, Switzerland, Dec. 8, 2011, XP017838253, slides 1-4.

Chindapol, Aik et al., "Design, Analysis, and Performance Evaluation for BICM-ID with Square QAM Constellations in Rayleigh Fading Channels," IEEE Journal on Selected Areas in Communications, IEEE Service Center, Piscataway, US, XP011055366, ISSN: 0733-8716, May 1, 2001, vol. 19, No. 5, Section IV.

International Search Report from PCT/EP2012/060895 dated Aug. 28, 2012, 4 pages.

* cited by examiner

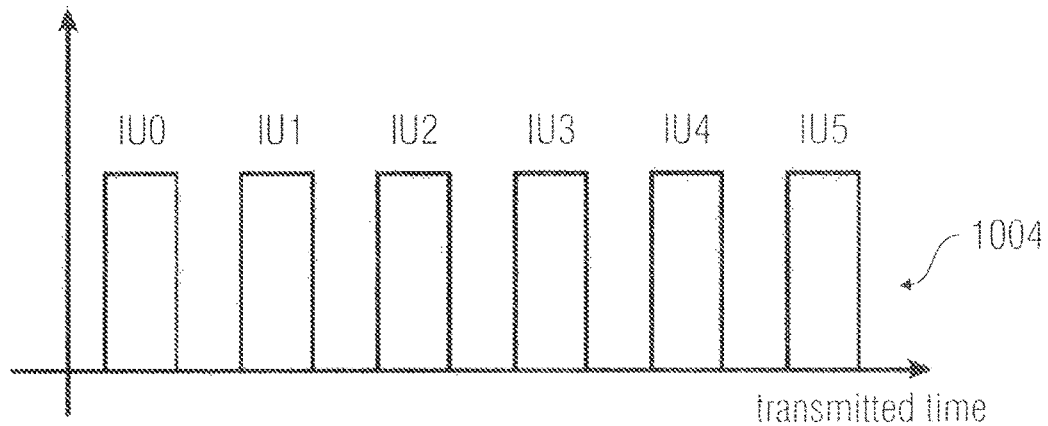

ILV controller implementation

I component of symbol j is transmitted in IU j mod M, where mod represents the modulo operation Q component of symbol j is transmitted in IU $(\text{floor}(j/M) \mod (M-1) + 1 + j) \mod M$
                                                    $\underbrace{\hspace{6cm}}_{805}$

FIG. 8D

ILV controller implementation

— interleave the I component of symbol j to the cell with index $(j \mod M) * N + \text{floor}(j/M)$, where N = FEC block length / M
                                                            $\underbrace{\hspace{5cm}}_{806}$ — interleave the Q component of symbol j to the cell with index $((\text{floor}(j/M) \mod (M-1) + 1 + j) \mod M * N + \text{floor}(j/M)$
                                                                $\underbrace{\hspace{7cm}}_{807}$ Then the IU k, with k from 0 to M – 1, is composed of the cells with indices $N * k + 0$ to $N * k + (N - 1)$ —808

FIG. 8E

TRANSMITTER AND RECEIVER USING NON-ADJACENT COMPONENT INTERLEAVING

CROSS-REFERENCE TO RELATED APPLICATIONS

This application is a continuation of copending International Application No. PCT/EP2012/060895, filed Jun. 8, 2012, which is incorporated herein by reference in its entirety, and additionally claims priority from European Applications No. EP 11170186.8, filed Jun. 16, 2011, and EP 11181660.9, filed Sep. 16, 2011, which are also incorporated herein by reference in their entirety.

BACKGROUND OF THE INVENTION

DVB-T2 as described in the DVB-T2 standard "Digital Video Broadcasting (DVB); frame structure channel coding and modulation for a second generation digital terrestrial television broadcasting system (DVB-T2)", ETSI EN 302 755 V1.1.1 discloses a plurality of so-called "modcods". A modcod is a pair consisting of a modulation/signal constellation such as QPSK, 16-/64-/256-QAM and code rates (1/2, 3/5, 2/3, 3/4, 4/5, 5/6). Each modcod has associated a spectral efficiency. The spectral efficiency is, for example, for a modcod of 16-QAM and a code rate of 2/3 as follows: 4 codebits/symbol*2 infobits/3 codebits=8/3 infobits/symbol=2.67 bits/s/Hz. Additionally, a constellation rotation including a coordinate interleaving can occur subsequent to the mapping of codebits. This procedure is, for example, disclosed in "Jonathan Stott: 'Rotated Constellations' available from http://www.dtg.org.uk/dtg/t2docs/RotCon_Jonathon_Stott-_BBC.pdf". The advantage of such a constellation rotation is a higher diversity when transmitting the coded signal which has been mapped to a certain signal constellation. This results in a higher robustness for a given modcod and a spectral efficiency provided by the given modcod.

The DVB-NGH (Next Generation Handheld) standard is very similar to the DVB-T2 standard and shares many of its blocks. Among others, it supports a large deal of the modcod parameters of DVB-T2, and it provides the option for constellation rotation and coordinate interleaving.

Typically, a DVB transmission comprises an FEC encoder for applying a certain forward error correction code to an information word. An information word may, for example, consist of 10,000 bits and advantageously consists of, for example, 1,000 bits to 100,000 bits. Depending on the code rate, the FEC encoder generates a codeword from the information word. When there is a code rate of, for example, 1/3, the codeword consists of 30,000 bits when the information word has 10,000 bits. For example, when the information word has 100,000 bits, then the codeword will have 300,000 bits. The bits of the codeword are introduced into a subsequent bit interleaver. The bit interleaver performs an interleaving within the codeword only, i.e. the for example 300,000 bits within an encoded codeword are interleaved so that an interleaved codeword results, but bits from one codeword are not interleaved with bits of a different codeword. Then, subsequent to the bit interleaver, an interleaved codeword having codebits exists. The codebits are grouped depending on a certain constellation diagram applied in a constellation mapping procedure. When the constellation diagram is, for example, a 256-QAM constellation diagram, then groups of 8 codebits are formed in order to map this group of 8 codebits into a constellation symbol. In 64-QAM, only 6 bits are grouped and mapped to one of the 64 different QAM symbols.

Depending on the implementation, a constellation rotation and a cyclic Q-delay can be applied to the individual symbols in order to obtain individual cells. However, the constellation rotation or the cyclic Q-delay can be dispensed with so that the symbols output by the constellation mapping are the same as the so-called cells in the context of the DVB standard. Then, cells are input into a cell and time interleaver to obtain interleaved cells. The cell interleaver interleaves within the number of cells making up a certain codeword, but no interleaving within the cells/modulation symbols themselves occurs. In the time interleaver the number of cells making up a certain codeword are interleaved with cells from a different codeword, but no interleaving within the cells/modulation symbols themselves occurs. The individual modulation symbols are expressed as complex numbers, where each complex number has an in-phase component or I-component and quadrature component (O-component). A pair of an I-component and a Q-component which are also called "data units" makes up a constellation symbol or cell. However, with constellation rotation and cyclic Q-delay, a cell is different from a symbol in that a Q-component of a different symbol is paired with a I-component of another symbol while, without the constellation rotation or a cyclic Q-delay, the paired I-component and O-component of a cell actually make up the constellation symbol in the I/Q plan. Then, subsequent to the cell and time interleaver, the interleaved cells are forwarded to a frame builder, that produces the frames to be transmitted.

The FEC encoder performs a channel encoding. The bit interleaver is provided for destroying statistical dependencies which would be there in the receiver between the bits of a symbol, such as the 8 bits of a 256-QAM. These statistical dependencies would have a negative impact on the decoding of the channel codes. For example, when a 256-QAM-symbol would be heavily distorted, then 8 sequential bits would be non-decodable, and such a so-called burst error would result in a more negative impact when compared to a situation where the bit interleaving is applied.

The constellation is obtained, as discussed before, by a mapping of the codebits to a certain desired signal constellation such as 16-QAM.

The constellation rotation and cyclic Q-delay is optional. However, the following example clarifies the technology behind the cyclic Q-delay as described in the prior art reference mentioned before.

[Before any Cyclic Delay]
Cell1 I1Q1
Cell2 I2Q2
Cell3 I3Q3
Cell4 I4Q4

[After Cyclic Delay of Length=4]
Cell1 I2Q1
Cell2 I3Q2
Cell3 I4Q3
Cell4 I1Q4

The cell interleaver makes sure that the I and Q coordinates of a symbol are transmitted at different time instants and on different subcarriers of, for example, an OFDM signal (OFDM=orthogonal frequency division multiplex).

The time interleaver distributes the cells, which belong to an FEC codeword, over a certain time which is also called the interleaver time period. This provides time diversity. Time diversity is advantageous in that only a portion of an FEC codeword is strongly distorted when the transmission channel is not so good at a certain time instant. However, the remaining less distorted portion of the codeword might be sufficient for a successful decoding operation.

The frame builder builds the transmission frames, where a transmission frame defines the actual transmission signal for a predetermined time interval such as 200 ms. Since the T2 standard allows several physical layer pipes (PLPs), i.e. more parallel structures, but with individual modcods, the frame builder builds the frames from different output signals of several existing time interleavers. Such an individual processing chain is also called a "pipe" in the DVB context.

On the receiver side, the chain is processed in the reverse order. One of the blocks in the receiver is the time de-interleaver. The time de-interleaver operates in a cell-wise manner, wherein a cell can comprise, e.g., a received non-rotated QPSK or a rotated 256-QAM. A rotated 256-QAM has 256 possible values for the I-coordinate and additionally for the O-coordinate. This means that a cell can have values such as a (transmitted in a noisy channel) 256*256-QAM=65 k-QAM, where, by contrast to a conventional 65 k-QAM, the constellation point grid is non-regular. Since a cell can be any one of these constellations, it is necessary to finely quantize the I- and O-coordinates in the receiver before the I- and Q-coordinates are input into the time de-interleaver. In the DVB-T2-implementation guidelines: "Digital Video Broadcasting (DVB); Implementation guidelines for a second generation digital terrestrial television broadcasting system (DVB-T2)", ETSI TR 102 831, it is outlined that one should apply a 10-bit quantization for the I- and Q-components and one should also provide several additional bits for the channel state information, i.e. for the information on an estimated signal-to-noise ratio (SNR) for this cell so that, in the end, one will necessitate 24 to 30 bits per cell, where a cell comprises a pair of data units, i.e. an I portion as a first data unit, a Q portion as the second data unit and the channel state information bits.

Subsequently, reference is made to FIG. 11 illustrating a certain portion of a DVB-T2-transmitter. The transmitter comprises an FEC encoder 1100. The output of the FEC encoder 1100 is connected to an input of a bit interleaver 1101. The FEC encoder 1100 receives, as an input, an information word which has, for example, 8100 bits and, provided that the FEC encoder 1100 applies an FEC code rate of 0.5, the number of code bits for an encoded information word or FEC codeword is 16,200 bits. This situation is illustrated schematically in FIG. 10 where item 1000 illustrates an information word and item 1001 illustrates an FEC codeword. The bit interleaver 1101 performs a bit interleaving within the bits of a single codeword and makes sure that bits of a codeword are not distributed into other codewords and vice versa. However, the bit order of the FEC encoder output is changed in order to increase the robustness for certain transmission conditions. The bit interleaver 1101 outputs code bits which are then input into a mapper performing a constellation mapping 1102. The mapping is, for example, a QPSK mapping where two bits are mapped into a single constellation symbol, so that the output of the constellation mapper 1102 is a group of 8100 symbols for the embodiment as illustrated at 1002 in FIG. 10. Then, the prior art provides for a constellation rotation, and cyclic Q delay operation in block 1103. The output of block 1103 is named a group of cells, where a cell consists of an I component and a Q component, but due to the cyclic Q delay, the Q component in a cell is different from the Q component which actually belongs to the I component in the cell as determined by the constellation mapper and as has been discussed before. This output of the cyclic Q delay is input to the cell interleaver in block 1104, where each input element consists of a first component or I component and a second component or Q component. When, block 1103 is not used, then a mapped constellation symbol is input into the cell interleaver in block 1104. The output of the cell interleaver becomes the input of the time interleaver 1105. The time interleaver 1105 finally outputs interleaved cells which are grouped into interleaving units and the interleaving units are supplied to a frame builder 1106 which then builds up the transmission frames.

The block constellation rotation and cyclic Q delay 1103 in FIG. 11 can be optional. Therefore, the input into the cell interleaver 1104 and time interleaver 1105 can be one of the following:

In a first possibility, the cells are normal signal constellations or mapped symbols and in the alternative possibility, the cells are rotated co-ordinate interleaved constellations which are rotated cells additionally including a cyclic delay as discussed before.

As already described in Jonathon Stott, "Rotated Constellations", the cyclic Q delay and the cell interleaver ensure that the I- and Q component of a rotated (QAM-) symbol are transmitted at different times and/or different frequencies (i.e., different sub-carriers of an OFDM symbol). This is visualized in FIGS. 3A-3C. FIG. 3A illustrates a frame separated into different frequency sub-carriers, where an I component and a Q component are positioned at different frequency sub-carriers, but within the same time frame. FIG. 3B illustrates the situation where a time-interleaving has taken place and the I component and the Q component of one mapped symbol are transmitted in the same frequency sub-carriers, but at different time instants, i.e., in different frames. Finally, FIG. 3C illustrates the situation where the I component and the Q component of one and the same mapped symbol are transmitted at different times and different frequency sub-carriers.

The benefit of this is that the I- and O-components of a rotated (QAM-) symbol are attenuated differently in a time- and/or frequency-selective channel (i.e. a fading and dispersive multi-path channel like a Typical Urban channel with 6 paths—TU6). Hence one can achieve diversity within a (QAM-) symbol, which is not possible for conventional modulation (i.e. without constellation rotation and co-ordinate interleaving). Note that co-ordinate interleaving is realized in DVB-T2 by the Cyclic Q Delay and the Cell Interleaver.

FIGS. 4A-4F show this diversity effect exemplarily for a rotated QPSK constellation. The left-hand side shows a non-rotated constellation, where the I and Q components are necessarily attenuated in the same way. The right-hand side shows a rotated constellation after co-ordinate interleaving in the transmitter, individual fading of the I- and Q-components in the channel, and co-ordinate de-interleaving in the receiver. This is hence the received constellation before de-rotation and demapping. For this example, one may assume that only the I component undergoes fading, while the Q component is not attenuated. FIGS. 4A and 4B show the received constellations in the case of no fading. It is clear that both constellations provide the same capacity, such that constellation rotation and co-ordinate interleaving brings neither gain nor loss.

FIGS. 4C and 4D show the case, where either the complete constellation (or only its I component, respectively) is attenuated by 6 dB, i.e. the amplitude is halved. While there is a significant performance loss for the non-rotated case, as all Euclidian distances have been halved, the loss is lower in the rotated case. To be fair, one may not compare FIG. 4C immediately with FIG. 4D; in the former, both I and Q have undergone fading, while in the latter, it is only the I component; hence for FIG. 4D the channel appears to be much more favorable.

A fair comparison would be to consider two QPSK symbols, i.e. 2 I- and 2 Q-components. It is assumed that one cell, i.e. one I- and one Q-component, is affected by fading. For the non-rotated case, the attenuated I- and Q-components are, of course, in the same mapped symbol, i.e. one has one attenuated symbol like in FIG. 4C and the other non-attenuated symbol looks like FIG. 4A. In the rotated case, one will have two mapped symbols like in FIG. 4D, where either only the I- or only the Q-component is attenuated.

As is commonly known, the non-rotated case with two differently attenuated symbols achieves only a smaller channel capacity than the rotated case with two similarly affected symbols, as the latter exploits a higher degree of diversity. The channel experienced by the rotated scheme (here, the "channel" includes the co-ordinate interleaving and de-interleaving) appears to be more "averaged" than the one experienced by the non-rotated scheme. As indicated by Jensen's inequality from information theory, an average channel has a higher capacity (for the same averaged signal-to-noise ratio, SNR) than averaging the capacity over different channels. This is the reason, why a (e.g. Rayleigh-) fading channel of a given mean SNR necessarily has a lower capacity than an AWGN of the same SNR.

The same principle applies here. The non-rotated case experiences one very good channel (FIG. 4A) and one rather poor channel (FIG. 4C), while the rotated scheme experiences twice a medium channel (FIG. 4D). In other words, the channel behavior has been averaged with respect to the non-rotated case. Therefore, the resulting symbols for the non-rotated case (1x like in FIG. 4A and 1x like in FIG. 4C) have a lower capacity than the corresponding symbols for the rotated case (2× like in FIG. 4D).

FIGS. 4E and 4F show the constellations for a very strong attenuation >10 dB. We see from FIG. 4E that the non-rotated symbol is practically useless, when the attenuation is strong, while the "half-way attenuated" rotated symbol merely degenerates to a kind of 4-ASK (Amplitude Shift Keying) constellation, which can be demapped quite well.

The conclusion is therefore that the co-ordinate interleaving, realized by the Cyclic Q delay and the Cell Interleaver in DVB-T2, increases the diversity order, thus averages the channel experienced by the rotated symbol (from mapper to demapper) and thus increases the channel capacity compared to the case of conventional non-rotated constellations.

Subsequently, the realization of the cyclic Q delay in DVB-T2 is discussed.

In DVB-T2, the Q components of all (QAM-) symbols belonging to a single FEC block (i.e. codeword) are shifted by 1 symbol with respect to their associated I component. That is, if the FEC block contains the following rotated symbols before the cyclic Q delay:

$$(I_0, Q_0)$$
$$(I_1, Q_1)$$
$$(I_2, Q_2)$$
$$...$$
$$(I_{N-1}, Q_{N-1}),$$

where N is the number of symbols in the FEC block, then it will be the following so-called cells after the cyclic Q delay:

$$(I_0, Q_{N-1})$$
$$(I_1, Q_0)$$
$$(I_2, Q_1)$$
$$...$$
$$(I_{N-1}, Q_{N-2}).$$

The DVB-T2 standard states that the Cell Interleaver is a pseudo-random interleaver, which mixes up all the cells of a FEC block arbitrarily.

When the time interleaver is configured to provide interleaving over frame boundaries, then it divides a FEC block into several packets (let us refer to them as Interleaver Units (IUs) in the sequel). For time interleaving over M T2/NGH frames (each is, e.g., 200 ms long), the cells of the FEC block (as output by the Cell Interleaver) have to be partitioned into M IUs. These can have identical sizes, quasi-identical sizes (i.e. sizes differ at most by 1 due to rounding effects, because the FEC block length is not an integer multiple of M) or individual sizes.

Then the transmitter transmits one IU per frame, i.e. the M IUs (packets of cells) of one FEC block are transmitted in M (possibly subsequent) T2/NGH frames. An IU is hence a packet of cells, which (a) belong to the same FEC block and (b) are transmitted in the same T2/NGH frame.

Subsequently, the disadvantages of this approach are discussed with reference to FIGS. 5A-5C.

With the current T2 standard, the chain of Cyclic Q Delay, Cell Interleaver and Time Interleaver achieves a pseudo-random distribution of the I- and Q-components of the rotated symbols composing one FEC block over the M T2 frames of the time interleaver duration. This leads to a situation as displayed in FIGS. 5A-5C. The time interleaver in this example is M=6 T2 frames long.

In FIG. 5A, the position of the I- and Q-components of various rotated symbols are displayed using the same indexing. For instance, the Q-component of the rotated symbol of index 0 is located in the top sub-carrier of frame 0, while the I-component of the same rotated symbol is located in the middle of frame 2. One can see that the pseudo-random distribution of the I- and Q-components leads to cases, where both components of one rotated symbol are in the same frame (#2, #5), or where they are in different frames (all others).

Now, the frames consisting of these cells are transmitted over a time- and/or frequency-selective channel. In the example of FIG. 5B, the channel is frequency-flat but fading in time, as can be observed for the time-varying SNR. While frames 0, 3, 4, and 5 have quite high an SNR, frames 1 and 2 are received at poor SNR and are therefore more or less lost.

FIG. 5C then shows, which of the I- and Q-components survive this fading channel. One finds that rotated symbols #0, #1 and #4 have one surviving component each, while #2 and #3 keep both components alive. On the other hand, #5 is completely lost.

As one saw before, this distribution of I- and Q-components is sub-optimum.

It is an objective of the present invention to provide an improved transmission or reception concept which has an increased robustness in non-optimum transmission conditions.

SUMMARY

According to an embodiment, a transmitter for transmitting information may have: a mapper for generating a plurality of mapped symbols, each mapped symbol having a first component and a second component, one of the first and second components being an in-phase component and the other of the first and second components being a quadrature component from a codeword; and a component interleaver for generating a plurality of interleaving units to be transmitted in a time sequence, the plurality of interleaving units consisting of at least three different interleaving units, wherein an interleaving unit has a plurality of pairs of first and second components, wherein the component interleaver is configured for assigning all first components and all second components of a codeword to the plurality of interleaving units in accordance with an interleaving rule, so that an I component of a mapped symbol and the Q component of the same mapped symbol are never assigned to one and the same interleaving unit, but to two different interleaving units.

According to another embodiment, a receiver for receiving information may have: a receiver input stage for providing a codeword having a sequence of interleaving units, the codeword having interleaved mapped symbols, each mapped symbol having a first component and a second component, wherein one of the first and second components is an in-phase component and the other of the first and second components is a quadrature component, wherein the interleaved mapped symbols are interleaved such that all first components and all second components of a codeword have been interleaved in accordance with an interleaving rule so that the first component and the second component belonging to the same mapped symbol are never assigned to one and the same interleaving unit, but are assigned to different interleaving units; a component de-interleaver for storing the codeword and for de-interleaving in accordance with the interleaver rule to obtain de-interleaved mapped symbols, each mapped symbol having the first component and a second component belonging to the first component; and a decoder for decoding the de-interleaved mapped symbols to obtain a decoded information unit represented by the mapped symbols.

According to another embodiment, a method of transmitting information may have the steps of: generating a plurality of mapped symbols, each mapped symbol having a first component and a second component, one of the first and second components being an in-phase component and the other of the first and second components being a quadrature component from a codeword; and generating a plurality of interleaving units to be transmitted in a time sequence, the plurality of interleaving units having at least three different interleaving units, wherein an interleaving unit has a plurality of pairs of first and second components, wherein the generating a plurality of interleaving units component interleaver assigns all first components and all second components of a codeword to the plurality of interleaving units in accordance with an interleaving rule, so that a I component of a mapped symbol and the Q component of the same mapped symbol are never assigned to one and the same interleaving unit, but to two different interleaving units.

According to still another embodiment, a method of receiving information may have the steps of: providing a codeword having a sequence of interleaving units, the codeword having interleaved mapped symbols, each mapped symbol having a first component and a second component, wherein one of the first and second components is an in-phase component and the other of the first and second components is a quadrature component, wherein the interleaved mapped symbols are interleaved such that all first components and all second components of a codeword have been interleaved in accordance with an interleaving rule so that the first component and the second component belonging to the same mapped symbol are never assigned to one and the same interleaving unit, but are assigned to different interleaving units; storing the codeword and de-interleaving in accordance with the interleaver rule to obtain de-interleaved mapped symbols, each mapped symbol having the first component and a second component belonging to the first component; and decoding the de-interleaved mapped symbols to obtain a decoded information unit represented by the mapped symbols.

Another embodiment may have a computer program having a program code for performing, when running on a computer, the above methods of transmitting and receiving information.

The present invention is based on the finding that the situation in which the two components of a mapped symbol are placed in the same interleaving unit or transmission frame has to be avoided. Since a fading situation in which the transmission channel is not good enough at a certain time results in the loss of an interleaving unit or transmission frame, i.e., the mapped symbols which are completely included within a transmission frame or interleaving unit are also completely lost. Stated differently, it is to be made sure that the two components of a mapped symbol, i.e., the I component and the Q component are processed in the interleaver such that an I component of a mapped symbol and the Q component of the same mapped symbol are never assigned to one and the same interleaving unit or transmission frame but are assigned to two different interleaving units or transmission frames. Then, even though a complete interleaving unit is lost, there is a good chance that the other component from a mapped symbol, from which a component got lost due to the lost interleaving unit, will be able to survive. Then, even though the mapped symbol has only survived with only one component, this component nevertheless carries valuable information which may be used in a receiver-side decoder. Stated differently, having one component of a mapped symbol survive is much better than if both components from a mapped symbol have not survived. It has been found that the decoder performance is much better if many mapped symbols have survived with one component compared to a situation in which a number of mapped symbols have fully survived with both components and a number of components is fully lost. Referencing to FIG. 5, this means that the prior art pseudo-random-like distribution of I- and Q components is not optimum.

From information theoretic considerations, it is best to use as much diversity as possible, which leads to more channel averaging. In this case, more "averaging" of the channel by using co-ordinate interleaving means: fewer symbols have both components lost (like #5), and more symbols have at least one surviving component. This could have been achieved, if the I-components (or likewise the Q-components) of the #2 and #5 had exchanged places. One would then have one surviving component for #0, #1, #2, #4 and #5 plus two surviving components for #3. This latter distribution would lead to a higher capacity and thus to a better performance, i.e. lower SNR necessitated or lower error rates.

The advantage of this invention is that such an improved temporal distribution of the I- and Q-components of rotated symbols is obtained by replacing the existing Cyclic Q Delay and Cell Interleaver by a new interleaver.

The transmitter for transmitting information, therefore, provides significant advantages due to the fact that the transmitter comprises a mapper for generating a plurality of mapped symbols, each mapped symbol having a first component and a second component, wherein one of the first and second components is an in-phase component and the other of the first and second components is a quadrature component, from a codeword. The mapped symbols are processed by a component interleaver for generating a plurality of interleaving units to be transmitted in a time sequence one after the other, wherein the plurality of interleaving units consists of at least three interleaving units, and wherein an interleaving unit comprises a plurality of pairs of the first component and the second component, wherein the component interleaver is configured for assigning all first components and all second components of a codeword to the plurality of interleaving units in accordance with an interleaving rule so that the first component of a mapped symbol and the second component of the same mapped symbol are never assigned to one and the same interleaving unit, but to two different interleaving units.

In an embodiment, the interleaving rule is additionally configured so that each favourable possibility for distributing the first and second components of the mapped symbols to the different interleaving units occurs one or more times in each codeword. In a further embodiment, the component interleaver is configured to assign all mapped symbols in a codeword to all different favourable possibilities for distributing the first and second components of the mapped symbols with a predetermined number of occurrences in a pseudo random or a deterministic manner and to distribute the first and second components in accordance with the assignment. The assignment and the distribution take place mapped symbol by mapped symbol, or all the mapped symbols of a codeword are assigned before the first and second components of the mapped symbols are distributed.

For example for interleaving over M=3 frames, there is a total of M×M=9 possibilities to distribute the I and Q component of a mapped symbol: (x, y) means that the I component is transmitted in frame x and the Q component in frame y. The 9 possibilities are hence (0,0), (0,1), (0,2), (1,0), (1,1), (1,2), (2,0), (2,1), (2,2). Of these M×M possibilities, M=3 are infavourable, since I and Q end up in the same frame: (0,0), (1,1), (2,2). Therefore, there are Mx(M−1) favourable possibilities to distribute the coordinates of the mapped symbols to frames or interleaving units, in this example we have 6 possibilities.

In a further embodiment, the first and second components are assigned so that each favourable possibility occurs for the codeword with a quantity being the same for all favourable possibilities or deviating by maximum 50% related to the average quantity.

A corresponding receiver such as a digital receiver is configured for receiving information. The receiver comprises a receiver input stage for providing a codeword having a sequence of interleaving units, the codeword comprising interleaved mapped symbols, each mapped symbol having a first component and a second component, wherein the interleaved mapped symbols are interleaved such that all first components and all second components of a codeword have been interleaved in accordance with an interleaving rule so that the first component and the second component belonging to the same mapped symbol are never assigned to one and the same interleaving unit. Particularly the received stream is such that the interleaving units of different code words are mixes with each other.

The receiver furthermore comprises a component de-interleaver for storing the interleaving units and for de-interleaving in accordance with the interleaving rule to obtain the interleaved mapped symbols, each de-interleaved mapped symbol comprising a first component and a second component belonging to the first component. The receiver furthermore comprises a decoder for decoding the de-interleaved mapped symbols to obtain decoded information units represented by the mapped symbols.

Rotated constellations may be used. In this embodiment, the transmitter side comprises a constellation rotation stage and the receiver side comprises a constellation de-rotation stage, which is, for example, part of the decoder. Further implementations of the decoder may comprise any kind of FEC or turbo decoder or, for example, a Viterbi decoder or, of course, a straightforward hard decision decoder.

BRIEF DESCRIPTION OF THE DRAWINGS

Subsequently, embodiments of the present invention will be discussed in more detail with reference to the accompanying drawings, in which:

FIG. 1B illustrates details of the pre-mapper processing and the mapper of FIG. 1a;

FIG. 1C illustrates details of the post-interleaver processing of FIG. 1a;

FIG. 2B illustrates details of the pre-de-interleaver processing of FIG. 2a;

FIG. 2C illustrates details of the decoder for post-de-interleaver processing of FIG. 2a;

FIGS. 7A-7C illustrate three different embodiments for interleaving the first and second components of the mapped symbols in a codeword;

FIG. 8A illustrates a time sequence of interleaving units;

FIG. 8B illustrates thirty different favourable possibilities for the example of six interleaving units in accordance with the invention;

FIG. 8D illustrates a further embodiment of an interleaver controller implementation for interleaving and de-interleaving;

FIG. 8E illustrates the further interleaver controller implementation and corresponding de-interleaver implementation;

DETAILED DESCRIPTION OF THE INVENTION

Figure 1A:
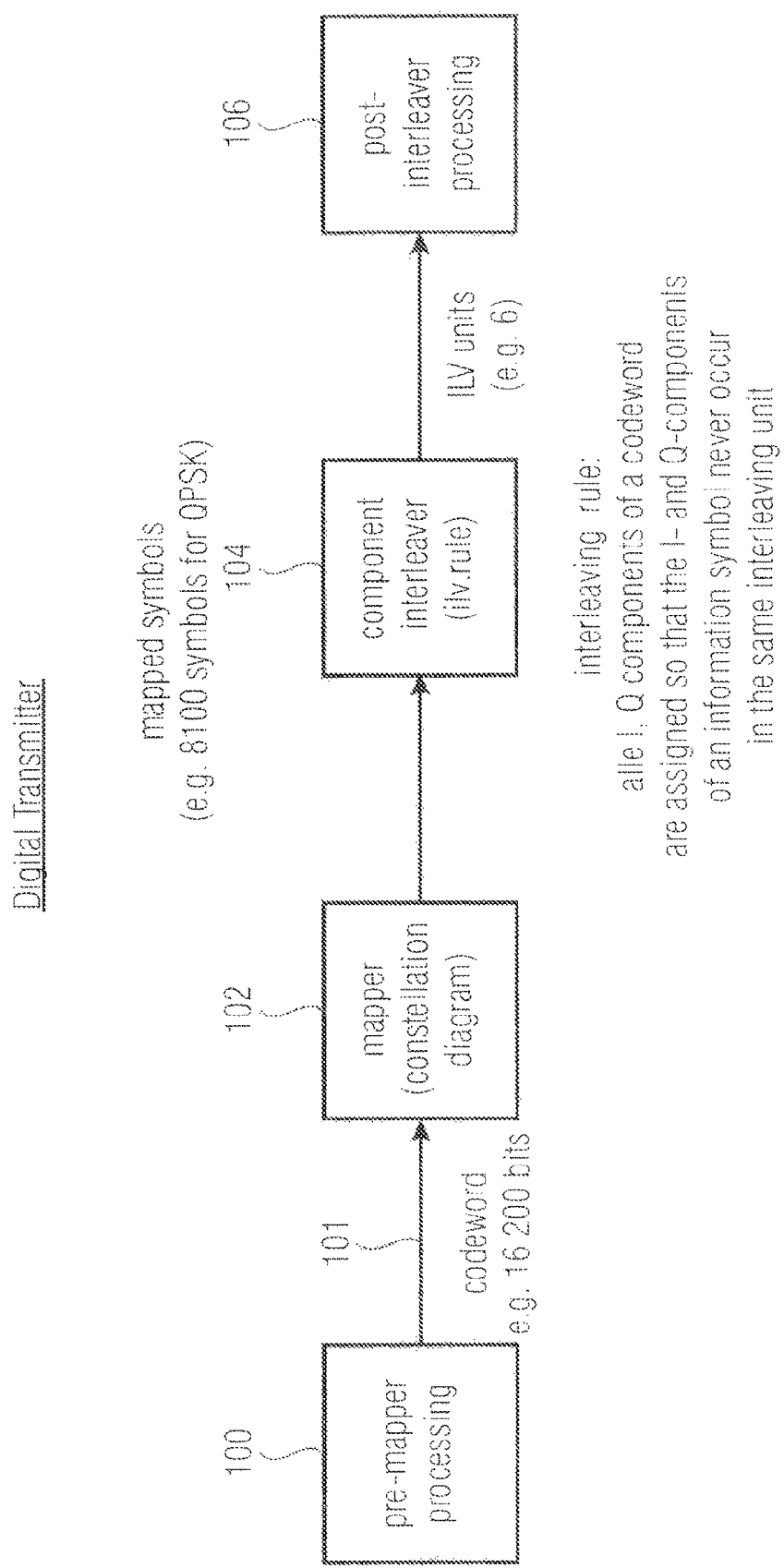
FIG. 1A illustrates an embodiment of a digital transmitter.
Figure 10:
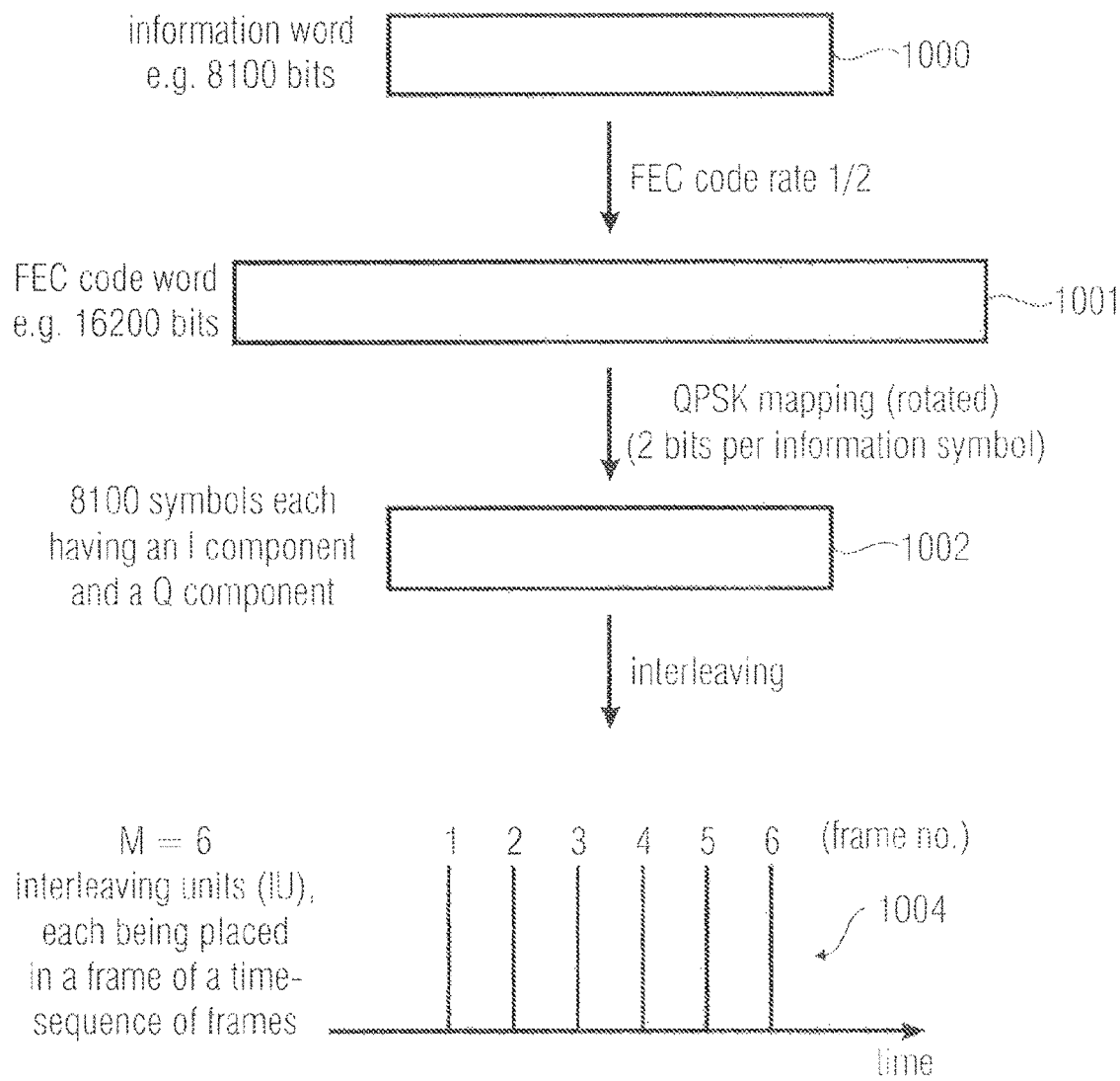
FIG. 10 illustrates the development of an information word having information units such as bits until interleaving units to be transmitted sequentially in time and vice versa.

FIG. 1A illustrates a digital transmitter. The digital transmitter comprises a pre-mapper processing block 100. The output of the pre-mapper processing block 100 is a codeword which has, for example, 16,200 bits as illustrated at 1001 in FIG. 10. The codeword is input into a mapper 102. The mapper is configured for generating a plurality of mapped symbols such as the 8100 symbols 1002 illustrated in FIG. 10. Each mapped symbol comprises a first component and a second component, where one of the first and second components is an in-phase component and the other of the first and second components is a quadrature component. The in-phase component is also known as the I component, and the quadrature component is also known as the Q component. When it is said that the mapped symbols are complex symbols, then the I component represents the real part of a complex value, and the Q component represents the imaginary part of the complex value. The output of the mapper 102, i.e., the mapped symbols 1002 illustrated in FIG. 10 are input into a component interleaver 104 for generating a plurality of interleaving units, the plurality of interleaving units consisting of at least three interleaving units. In the implementation example illustrated in FIG. 10, there are six interleaving units 1004, but advantageously there are three, four, five, six or even more interleaving units. Each interleaving unit comprises a plurality of pairs of a first component and a second component, but the first component and the second component comprised in a pair are not from the same mapped symbol, i.e., do not belong together for jointly representing the complex value output by the mapper for a certain number of bits. Instead, the first and second components are taken from different mapped symbols.

Specifically, the component interleaver 104 is configured for assigning all first components and all second components of a codeword to the plurality of interleaving units in accordance with an interleaving rule, so that a first component of an mapped symbol and the second component of the same mapped symbol are never assigned to one and the same interleaving unit but are assigned to two different interleaving units. The interleaving units 1004 of FIG. 10 are output by the component interleaver 104 and input into a post-interleaver processing 106. The post-interleaver processing processes the interleaving units so that they are transmitted to a digital receiver such as the digital receiver illustrated in FIG. 2A.

The mapper 102 is configured for applying any constellation diagram. When, for example, the mapper has a QPSK (quadrature phase shift keying) constellation diagram, then the constellation diagram has four (complex) points, and each point is represented by two messaging units such as code bits. This means that each state represents two bits and the mapper outputs 8100 mapped symbols for 16,200 bits.

However, when the mapper is configured for applying a 16-QAM constellation diagram, then each (complex) state of the constellation diagram represents four bits and one codeword having 16,200 bits would result in 4050 mapped symbols at the output of the mapper 102.

Figure 1B:
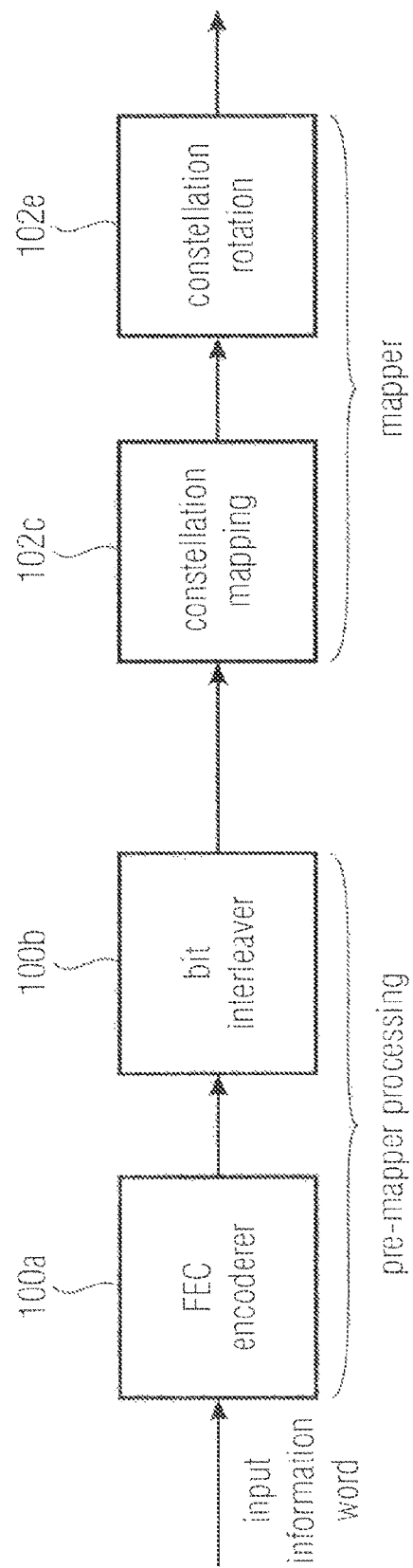

FIG. 1B illustrates details of the pre-mapper processing. In an embodiment, the pre-mapper processing 100 comprises an FEC encoder 100a and a subsequently connected bit interleaver 100b. The FEC encoder 100a is configured for encoding an input information word to output an FEC codeword or codeword or FEC block (FEC=forward error correction). In an embodiment, the FEC encoder may comprise a code rate of 1/2 which means that the codeword output by block 100a has a number of bits which is twice the number of bits of the input information word. However, when the FEC encoder has a code rate of 1/4 then the number of output bits of a codeword would be four times the number of bits in the input information word and so on. Hence, the FEC encoder is configured for encoding an input information word to obtain a codeword having a number of codeword units such as bits. The FEC encoder output is input into a bit interleaver 100b or "codeword unit interleaver" for interleaving the codeword units within the codeword but not among two or more codewords and the bit interleaver results in a codeword which is bit-interleaved. However, the bit interleaver is optional. When block 100b is not provided, then the input into the mapper 102 of FIG. 1A is a codeword which has not been interleaved, and when the bit interleaver 100b is present, then the codeword input into the mapper has been interleaved by the functionality of the bit interleaver. The bit interleaver may be configured for implementing a straightforward row/column interleaver, which means that the codeword is written into a memory row after row and the output is read from the memory column after column.

FIG. 1B furthermore illustrates details of the mapper 102 of FIG. 1A. The mapper 102 may comprise a constellation mapper 102a and a subsequently connected constellation rotation block 102b. Depending on the implementation, the constellation mapping and the constellation rotation in blocks 102a, 102b can also be applied within a single operation. For clarity of description, however, the mapper 102 is illustrated in FIG. 1B as two separate actions, where the first action is a straightforward mapping in block 102a in accordance with a certain constellation diagram and the second action is a rotation of the mapped symbols so that the mapped symbols become rotated mapped symbols. However, when the constellation rotation 102b is not applied, then the mapped symbols are non-rotated mapped symbols generated by block 102a alone. It is to be noted that constellation rotation functionalities have a good effect together with the described component diversity, since the mapped symbols, which have been rotated, have the characteristic that the first component as well as the second component comprise information on both bits (in the example of QPSK) which means that the information is more distributed compared to a situation in which the first component would just represent the first bit of a bit pair for QPSK and the second component would just represent the second bit of a pair for a QPSK mapped symbol.

It is to be noted that rotated constellations exist not only for QPSK but for all other useable and well-known constellation diagrams such as QAM, 16 QAM, 8 PSK or any other kind of constellation diagrams or mapping rules.

Figure 11:
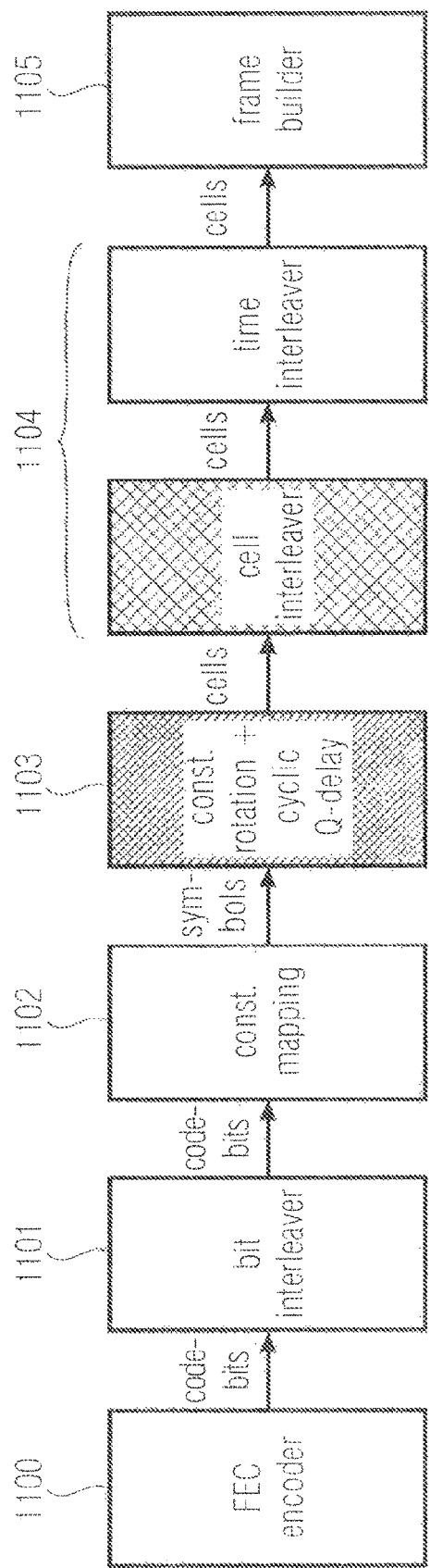
FIG. 11 illustrates a prior art DVB-2 transmitter chain.

The post-interleaver processing block 106 illustrated in FIG. 1C may comprise a frame builder 106a, the subsequently connected frequency interleaver 106b and, finally, an RF transmitter 106c (RF=radio frequency). Basically, the post-interleaver processing can be considered as a transmitter circuit for transmitting each interleaving unit at a different time in the time sequence in which the interleaving units are to be transmitted. However, applying a further frequency interleaving is advantageous for frequency-fading channels so that, in the end, not only robustness with respect to time-fading channels but also with respect to frequency-fading channels is obtained. The frame builder 106a may furthermore be configured to build frames not only for a single transmitter chain illustrated in FIG. 11 but from several such transmitter chains illustrated in FIG. 11. In view of this, the frame builder 1105 may be implemented in the same way as the frame builder 106a in FIG. 1C. Accordingly, when more than one transmitter chain as illustrated in FIG. 11 is presented, the combination of the frame builder 106a and the frequency interleaver 106b may mix up in the time and the frequency domain the component-wise interleaved symbols from the multiple transmitter chains, but only in such a way that all symbols belonging to the same interleaving unit are transmitted in the same transmission frame.

Figure 2A:
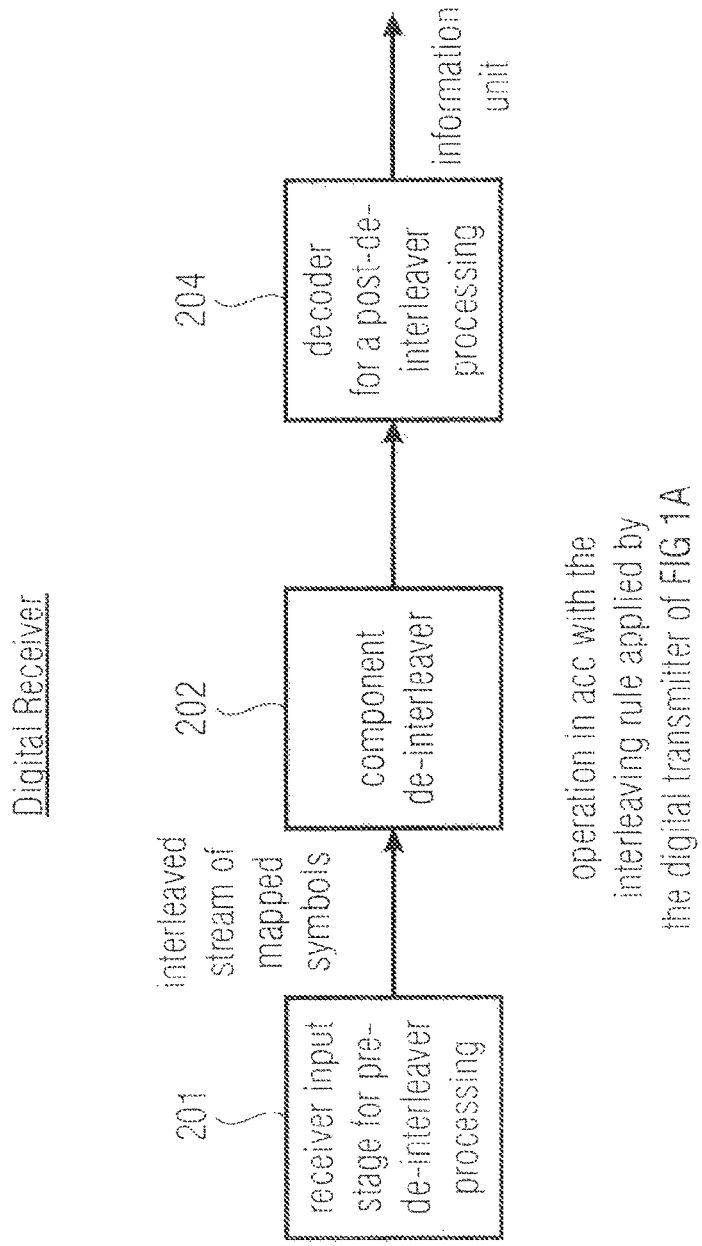
FIG. 2A illustrates an embodiment of a digital receiver.

FIG. 2A illustrates a block diagram of a digital receiver for receiving information. The receiver comprises a receiver input stage 201 for performing a pre-de-interleaver processing. Specifically, the receiver input stage 201 is configured for providing a codeword having a sequence of interleaving units, the codeword comprising interleaved mapped symbols, wherein each mapped symbol has a first and a second component, wherein one of the first and second components is an in-phase component and the other one of the first and second components is a quadrature component. The interleaved mapped symbols are interleaved in accordance with the interleaving rule applied by the digital transmitter of FIG. 1A. Specifically, the interleaving rule, by which the interleaved mapped symbols have been interleaved is such that all first components and all second components of a codeword have been interleaved in accordance with the interleaving rule such that the first component and the second component belonging to the same mapped symbol are never assigned to one and the same interleaving unit or transmission frame. Hence, the receiver input stage 201 provides an interleaved stream of mapped symbols comprising the interleaving units separated from each other as have been generated by the component interleaver 104 of FIG. 1A. The interleaved stream of mapped symbols is input into a component de-interleaver 202. The component de-interleaver 202 is configured for storing the codeword consisting of the interleaved stream of mapped symbols and for de-interleaving in accordance with the interleaving rule to obtain a de-interleaved mapped symbol, each mapped symbol comprising a first component and a second component belonging to the first component. Hence, the output of block 202 is the plurality of mapped symbols 1002 illustrated in FIG. 10, naturally affected by transmission errors, noise, etc. However, if there was a perfect transmission channel, then the output of the component de-interleaver 202 would be exactly the same as the mapped symbols indicated at 1002 in FIG. 10 for the transmitter side. Hence, FIG. 10 can also be seen as a representation of the situation in the receiver, when FIG. 10 is read from bottom to top.

The de-interleaved mapped symbols are input into a decoder 204 for performing a post-de-interleaver processing to obtain decoded information units which have been represented by the mapped symbols. Hence, the result of block 204 corresponds to the information word 1000 consisting of the individual information units illustrated in FIG. 10.

Figure 2B:
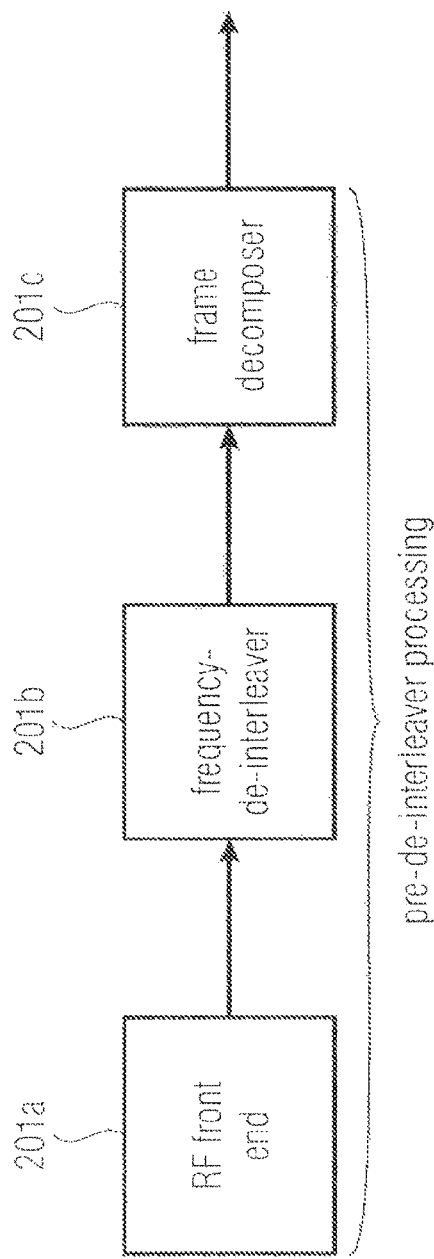

The receiver input stage 201 of FIG. 2A comprises, as illustrated in FIG. 2B, an RF front end 201a, a frequency-de-interleaver 201b and a frame decomposer 201c. The frame decomposer is configured to provide streams to different component de-interleavers simultaneously, i.e., to implement different so-called pipes.

Figure 1C:
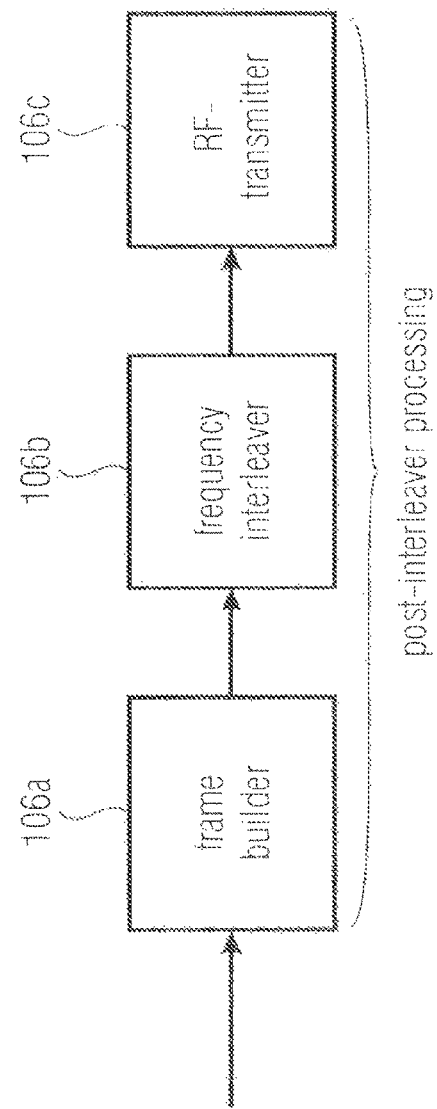

Hence, the pre-de-interleaver processing corresponds to the post-interleaver processing illustrated in FIG. 1C. However, when the post-interleaver processing of FIG. 1C is implemented in a different manner, i.e., when a frequency interleaver 106b is not provided for example or provided at a different position in the transmitter chain, then the pre-de-interleaver processing is configured analogously so that the actions performed on the encoder side are undone or cancelled by corresponding operations on the decoder or receiver side.

Figure 2C:
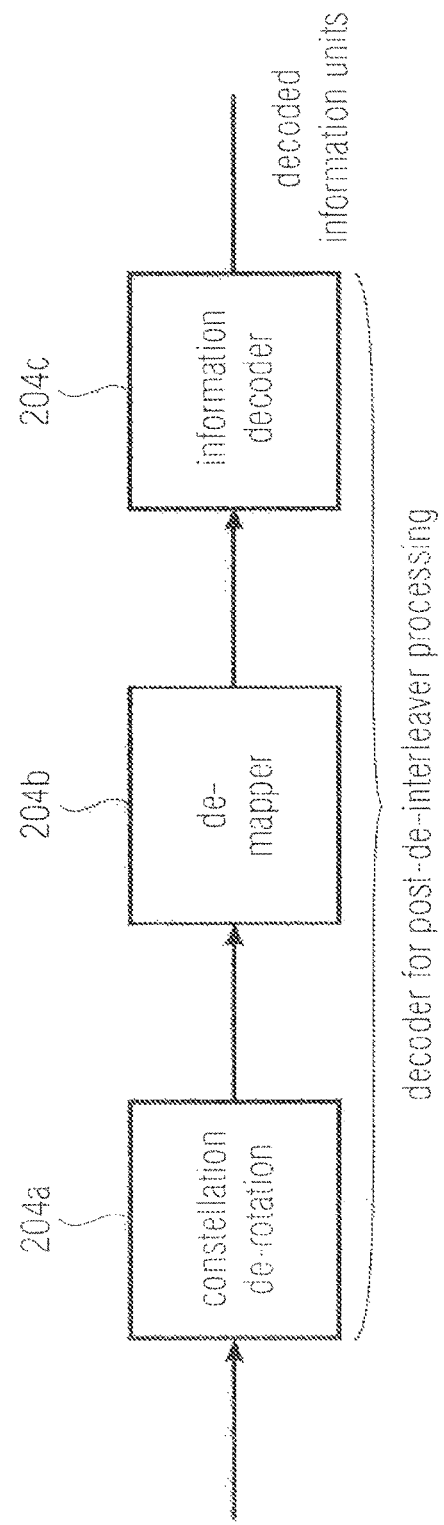
Figure 3C:
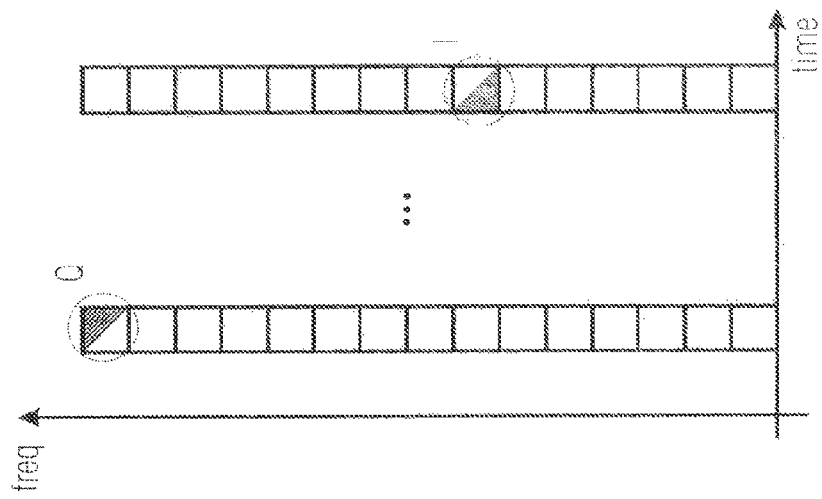
FIGS. 3A-3C illustrate the combined time/frequency component diversity.
Figure 3B:
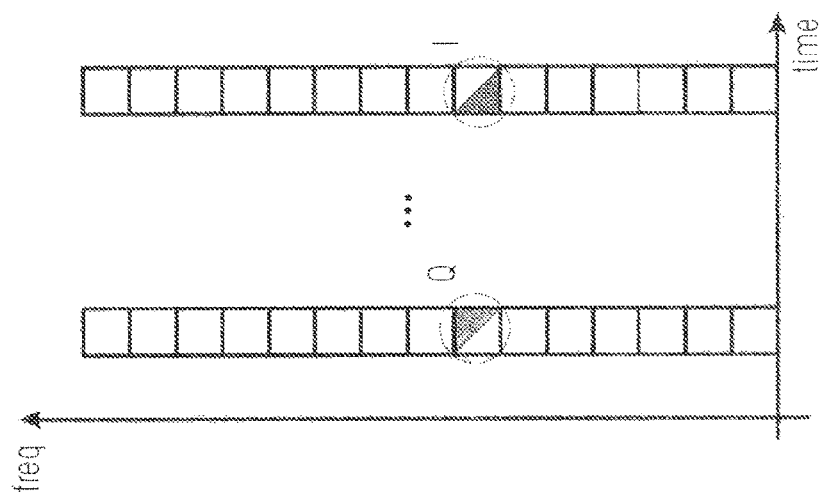
Figure 3A:
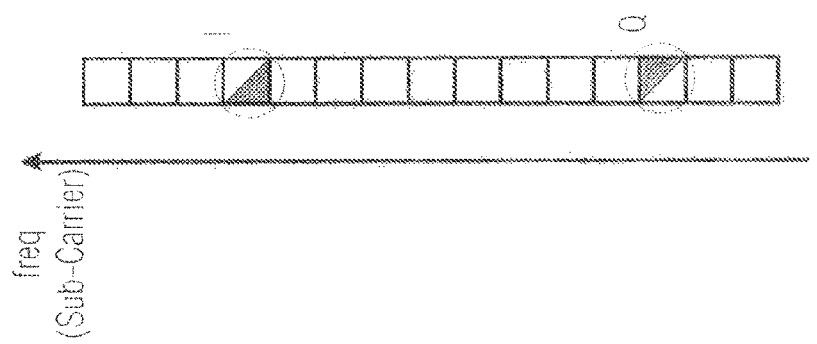

FIG. 2C furthermore comprises a further implementation of the decoder 204 for post-de-interleaver processing. The decoder comprises a constellation de-rotation block 204a, a de-mapper 204b and a subsequently connected information decoder 204c. However, as is known in the art, a large variety of decoding operations exist where the demapper and the information decoder are included in one and the same functionality. Such decoding concepts comprise MLSE or other decoding concepts such as iterative decoding and demapping concepts relying on soft input/soft output data for finally obtaining the decoded information units.

Figure 6A:
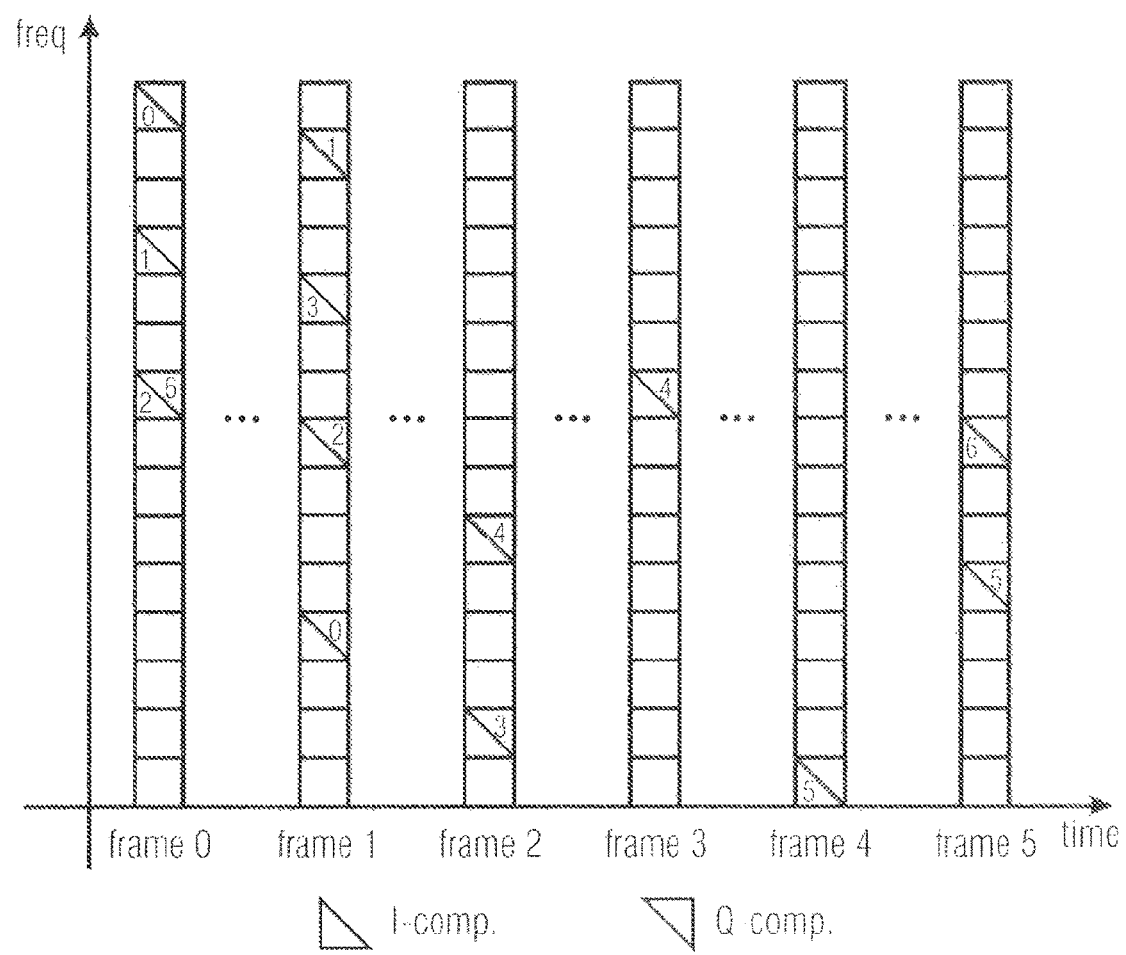
FIGS. 6A-6C illustrate a similar situation as in FIGS. 5A-5C but with a different component interleaving.
Figure 6B:
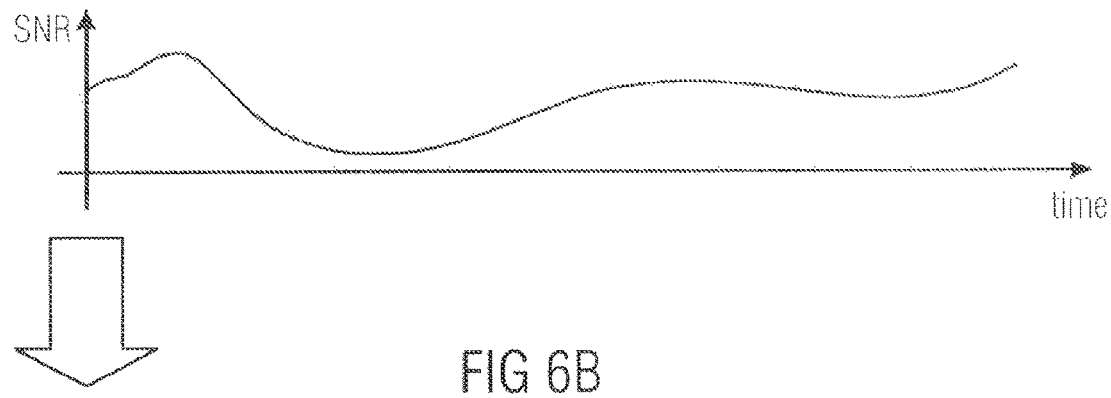
Figure 6C:
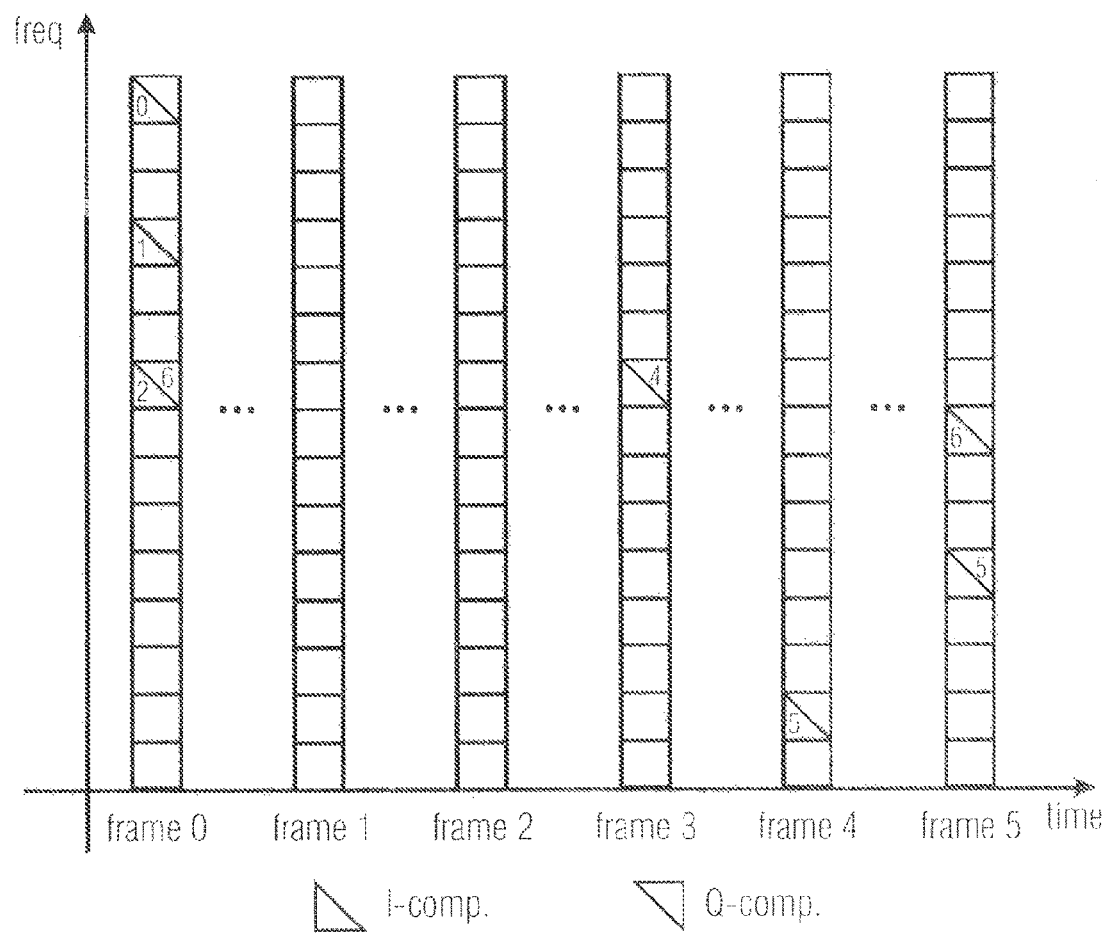

FIGS. 6A-6C illustrate one approach, in which the interleaving is performed in such a way that all first components and all second components of an information word are assigned to two different interleaving units. In this approach, the algorithm known from the cyclic Q delay indicated in FIG. 11 is used but the Q component of any rotated symbol is shifted by one interleaving unit instead of one symbol.

In other words: the Q-component of any rotated symbol is transmitted in a frame after its corresponding I-component. For the very last frame, that the considered FEC block occupies inside the time interleaver, the O-component is transmitted in the very first frame inside the time interleaver (i.e. the IU-wise shift is cyclic over the time interleaver length). Let us refer to this scheme as "Cyclic IU Delay".

FIG. 6A shows this for an example: #0, #1 and #2 all have their I-component in frame 0 and their O-component in frame 1. #3 has its I-component in frame 1 and its Q-component in frame 2. #4 has its I-component in frame 2 and its Q-component in frame 3. #5 has its I-component in frame 4 and its O-component in frame 5. Finally, #6 has its I-component in frame 5, and its O-component in frame 0 (i.e. the cyclic shift described above).

Figure 4A:
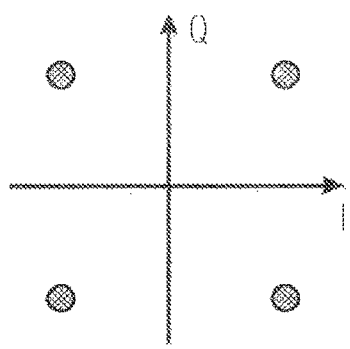
FIGS. 4A-4F illustrate details on the use of rotated constellations in non-optimum transmission channels.
Figure 4B:
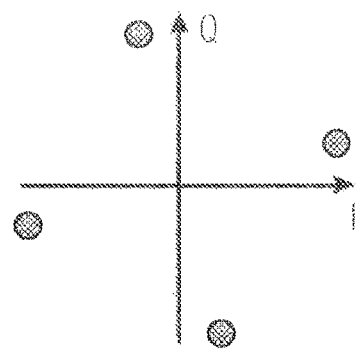
Figure 4C:
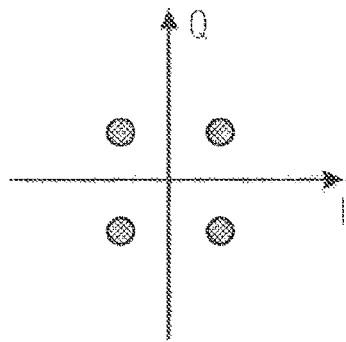
Figure 4D:
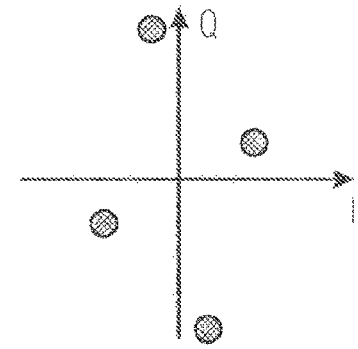
Figure 4E:
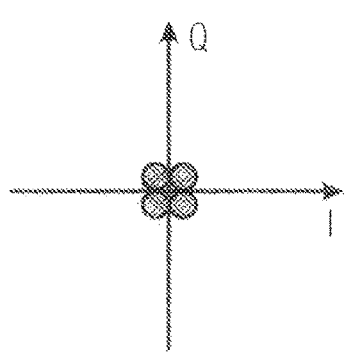
Figure 4F:
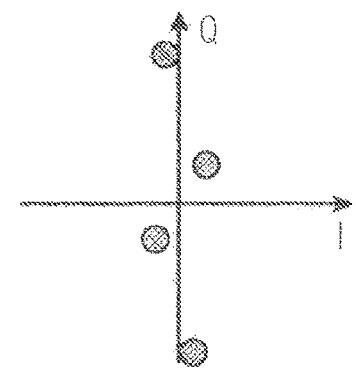
Figure 5A:
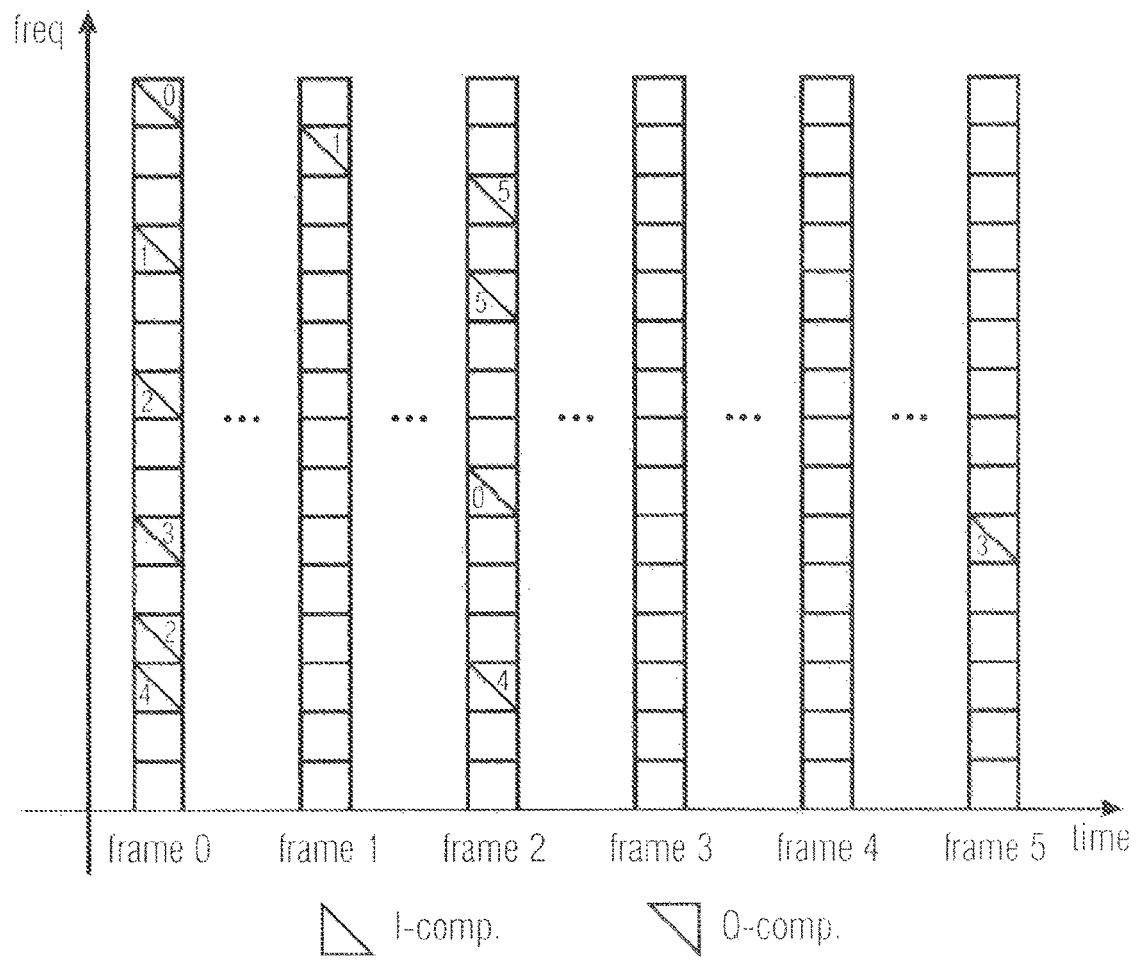
FIGS. 5A-5C illustrate a situation of a prior art transmitter in the presence of a varying channel quality.
Figure 5B:
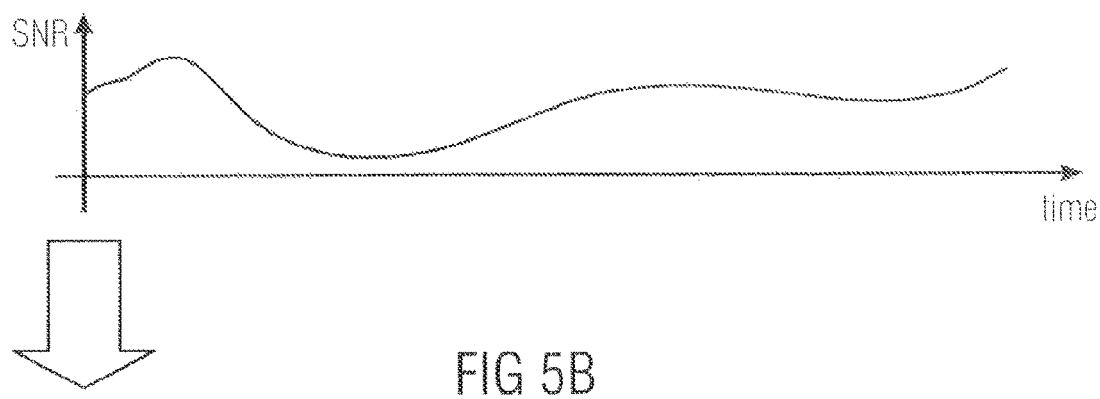
Figure 5C:
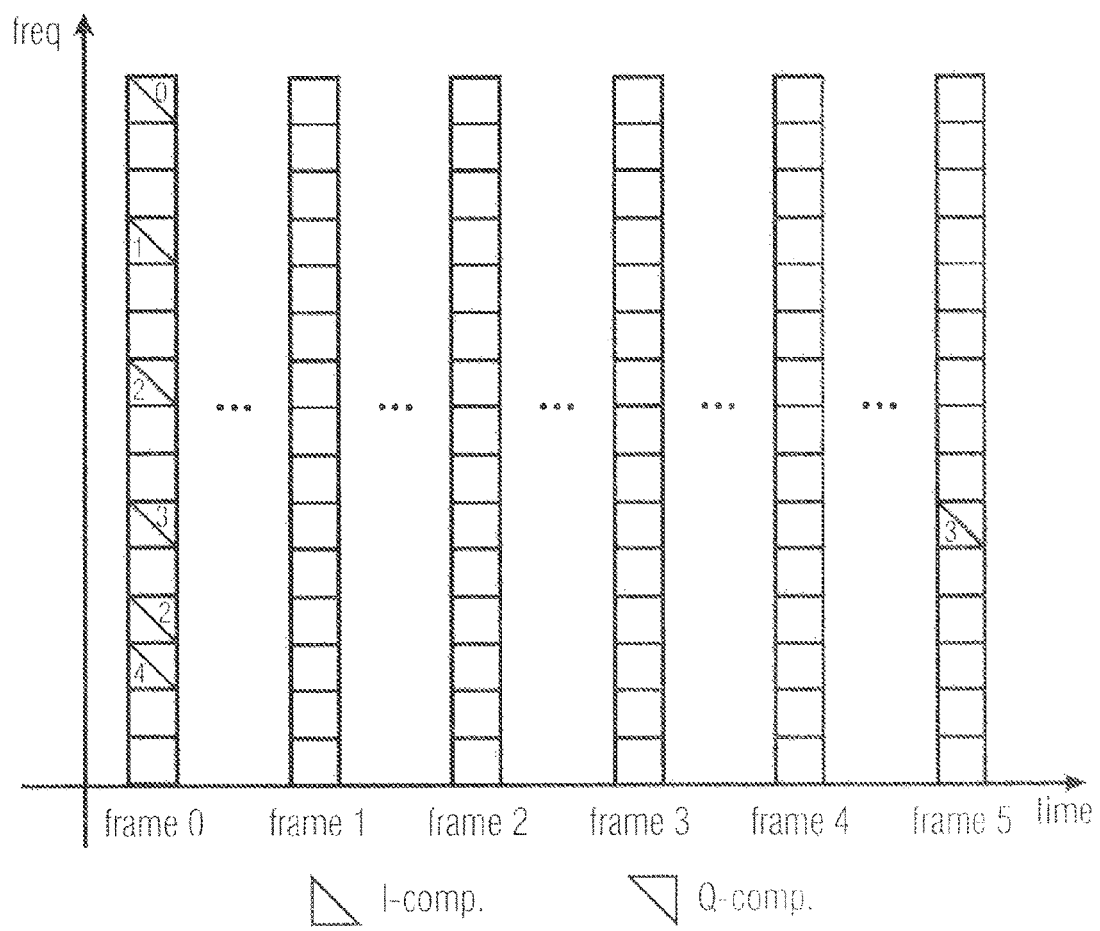

Transmitting this temporal distribution of I- and Q-components over the same fading channel as in the previous example (FIG. 4B) leads to the channel output displayed in FIG. 6C. We find that #0, #1, #2 and #4 have one surviving component, and #5 and #6 have two surviving components.

On the other hand, #3 is completely lost. The same is true for all rotated symbols, which have their I-component in frame 1 and accordingly their Q-component in frame 2.

This embodiment can be improved as described subsequently, and the subsequently described algorithms provide maximum time diversity under all circumstances.

To explain this embodiment, we introduce an ordered pair (m; k) for each symbol: m expresses the index of the interleaving unit that carries the I-component of this symbol, while k represents the index of the interleaving unit that carries the Q-component of this symbol.

For maximum diversity, the I- and O-components of the rotated symbols should use as many ordered pairs (m; k) as possible except those, where m and k are identical: (m; k=m). Hence, for a time interleaver of length M frames, there are $M*(M-1)$ such suitable pairs with m unequal k. The new Component Interleaver can assign all rotated symbols on a pseudo-random basis to these pairs, and then distribute their I- and Q-components accordingly to the respective IUs, that is frames, i.e. the I-component to IU/frame k and the O-component to IU/frame m. If we consider the example of FIG. 4b with M=6 and the given fading channel, we have a loss of both components only for symbols associated with the 2 pairs (1; 2) and (2; 1) out of $6*(6-1)=30$ suitable pairs, i.e. only for 1/15 of all symbols. Hence, we have achieved maximum diversity, i.e. maximum averaging by this method.

Figure 8C:
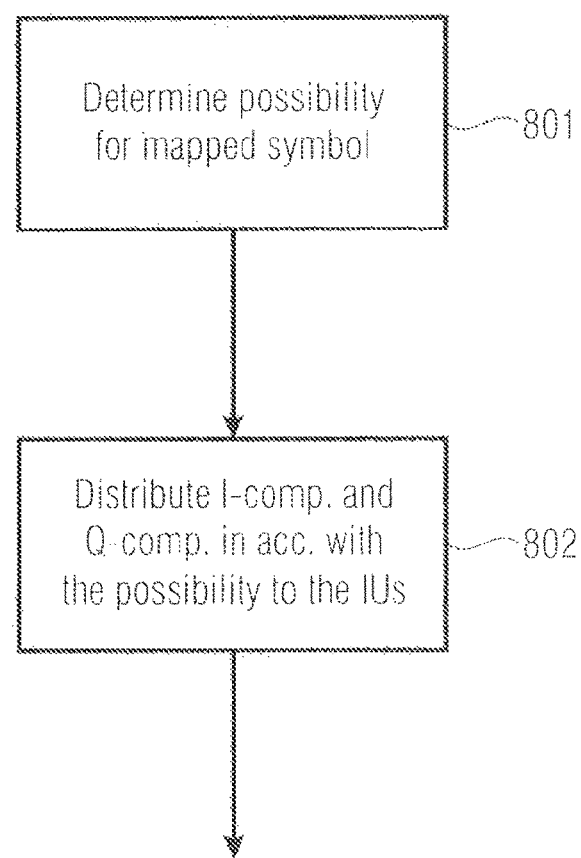
FIG. 8C illustrates an embodiment of performing the interleaver operation and, with respect to the interleaving rule, a corresponding de-interleaver operation.

This algorithm is described in more detail with respect to FIGS. 8A-8C. FIG. 8A illustrates a sequence of interleaving units corresponding to the interleaving units 1004 of FIG. 10, when the interleaving units are transmitted in the time sequence. FIG. 8A is only exemplary and, typically, the interleaving units would not be transmitted with a break between the interleaving units, but time-contiguous to each other, i.e., without any substantial breaks in between. However, when there are, for example, other interleaving units from other transmitter chains or, generally, other audio or video programs, then there could be interleaving units from other channels interspersed between the interleaving units IU1 to IU6 illustrated in FIG. 1A. In this embodiment, six interleaving units are indicated.

The table in FIG. 8B illustrates all thirty possible ordered pairs as to how an mapped symbol could be distributed among the interleaving units. Exemplarily, the notation 2,5 means that the first or I component of an mapped symbol is assigned to interleaving unit 2 and the second or Q component of the same mapped symbol is assigned to interleaving unit 5. Analogously, the notation 5,1, for example, means that the I component of a mapped symbol is assigned to the fifth interleaving unit and the second or Q component is assigned to the first interleaving unit and so on. As illustrated in FIG. 8C at 801, a determination is made for each mapped symbol included in the codeword output by the mapper 102 of FIG. 1A according to which possibility for the ordered pairs this mapped symbol is to be distributed. Hence, all the 8100 symbols, for example, are assigned to the different (thirty) possible ordered pairs indicated in the table 800 of FIG. 8B. The determination of the ordered pair for each mapped symbol of step 801 may be performed in such a way that each possible ordered pair receives almost the same number of mapped symbols. Hence, this interleaving rule makes sure that a situation cannot occur in which one and the same mapped symbol has both of its components within the same interleaving unit, since these six ordered pairs which are forbidden, i.e., where both components would be assigned to one and the same interleaving unit, do not and are not allowed to occur in the table 800.

Subsequent to the determination of the ordered pair to be taken for each mapped symbol in step 801, the step 802 is performed in which the I component and the Q component of the mapped symbols are distributed in accordance with the ordered pair determined in step 801. A first way to implement steps 801 and 802 would be to perform an assignment for each of the mapped symbols for a codeword before the actual distribution is performed and, subsequent to the determination for all mapped symbols in a codeword, the actual distribution into the interleaving units is performed. However, it is of advantage to perform the determination of the ordered pair for a certain mapped symbol and to then distribute the I and Q components of this mapped symbol into the corresponding interleaving unit and to subsequently perform both steps for the next mapped symbol and so on.

In a further alternative, the Q components are obtained in a certain order, and the Q components are resorted in accordance with a specified rule, such as by cyclically shifting within a row. The I components would not be interleaved at all and one would not have to specify any ordered pairs at all, but the result would nevertheless be the situation illustrated in FIG. 7A, table 1, i.e., items 701a and 701b.

The way in which the determination of the favourable distribution possibility for each mapped symbol is performed can be done in a pseudo random or a systematic way, which means that this interleaving rule can be reversed at a de-interleaver included in a receiver which then applies the corresponding interleaving rule so that the distribution is cancelled out. It is to be noted that the pseudo-random distribution according the present invention differs from the pseudo-random distribution in the DVB-T2 standard in a very significant point: Whereas the latter distributes over all $M^2$ possible ordered pairs, the device according to this invention employs only the Mx(M−1) favourable possibilities, where I and Q component are distributed to different interleaving units, i.e. frames. One way of performing this systematic procedure is to use the table 800 and to start with the first mapped symbol and to use for the first mapped symbol the first element such as 1,2 in table 800 and to then use the second mapped symbol and to apply the second value of the table which is 2,1 and so on. Then, the number of mapped symbols is "walked through" and the table 800 is walked through from left to right and row by row, so that, for example, the sixth mapped symbol receives a distribution 6,1 and the seventh mapped symbol receives a distribution 1,3 and so on.

Based on table 800 which represents an interleaving rule in this case, a corresponding de-interleaver processing can easily be performed by just reversing the sorting done in the transmitter-side interleaver. However, an alternative procedure would be that the table 800 is walked through columnwise so that the second mapped symbol receives 1,3 as the distribution possibility, the fifth mapped symbol receives 1,6 and the sixth mapped symbol receives 2,1 as the distribution possibility.

It is clear that many other "pseudo random" procedures can be performed such as walking through the table 800 in a different manner such as by rows but where from one distribution possibility to the next a certain number of intermediate possibilities are left out and are filled out later. For example, one way would be to use for the first mapped symbol the possibility 1,2 and to use for the second mapped symbol the possibility 3,1 and to use for the third mapped symbol the possibility 5,1 and to use for the fourth mapped symbol the possibility 2,1 and to use for the next mapped symbol the possibility 4,1 and so on.

Figure 7A:
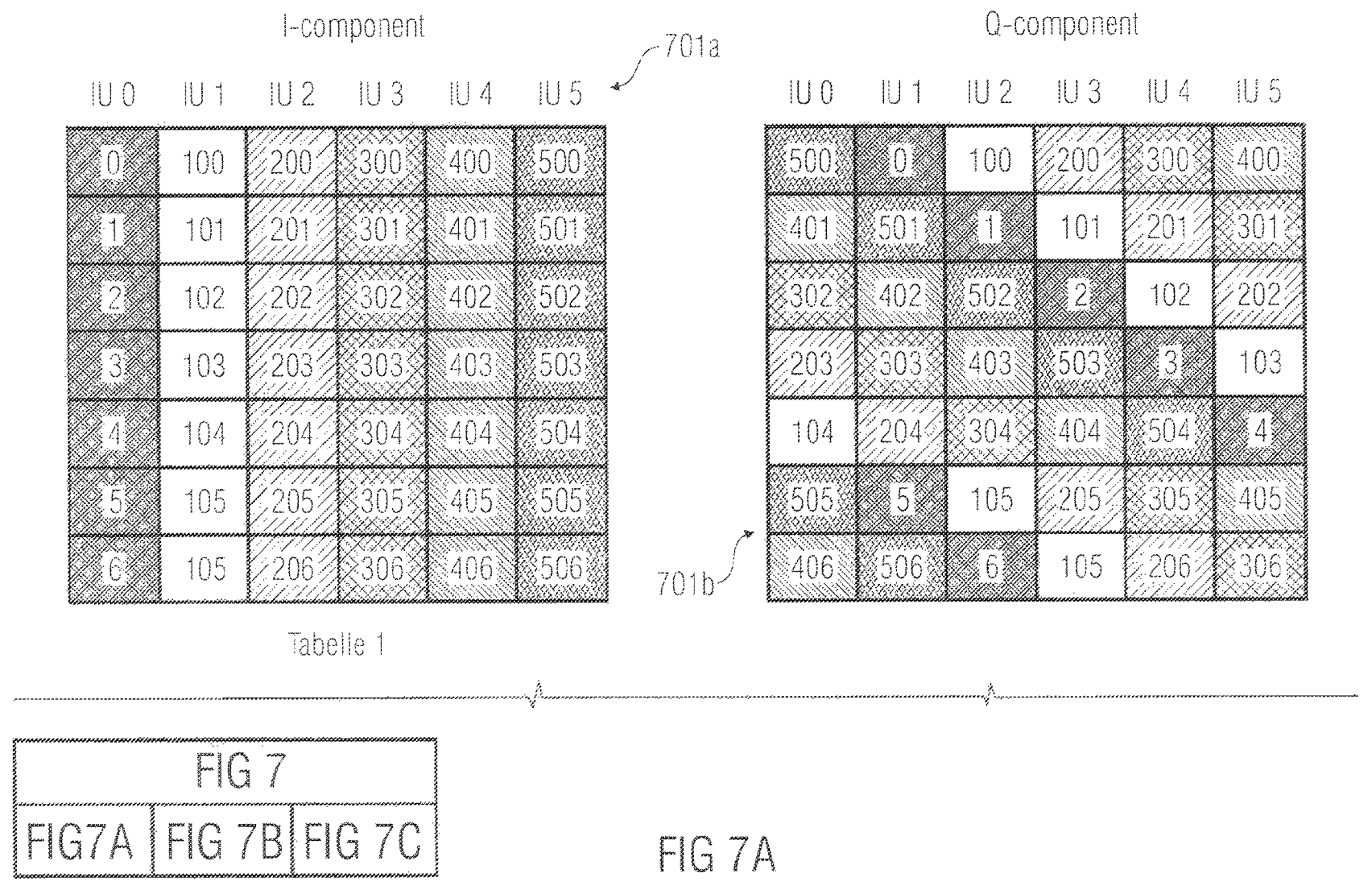
Figure 7B:
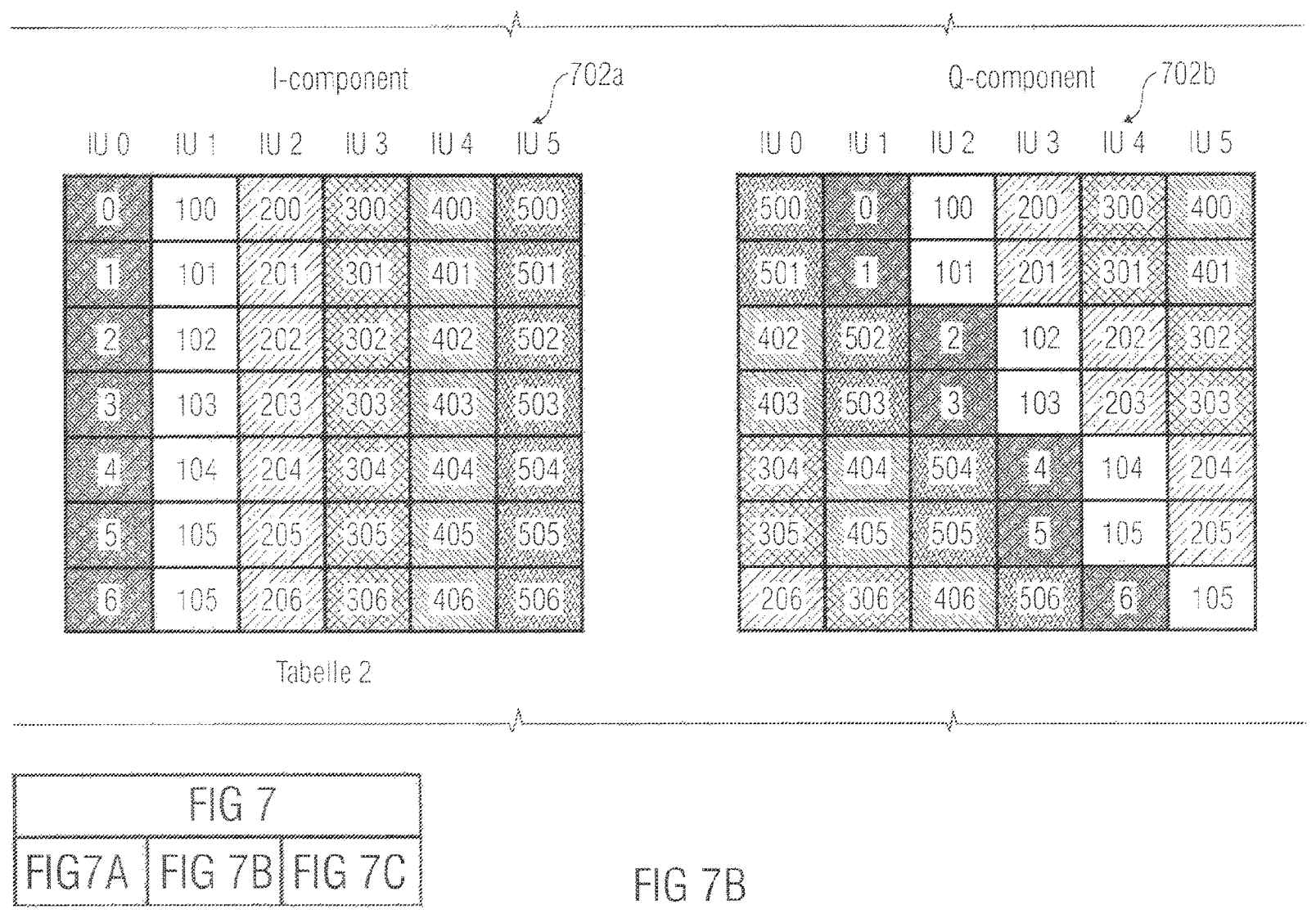
Figure 7C:
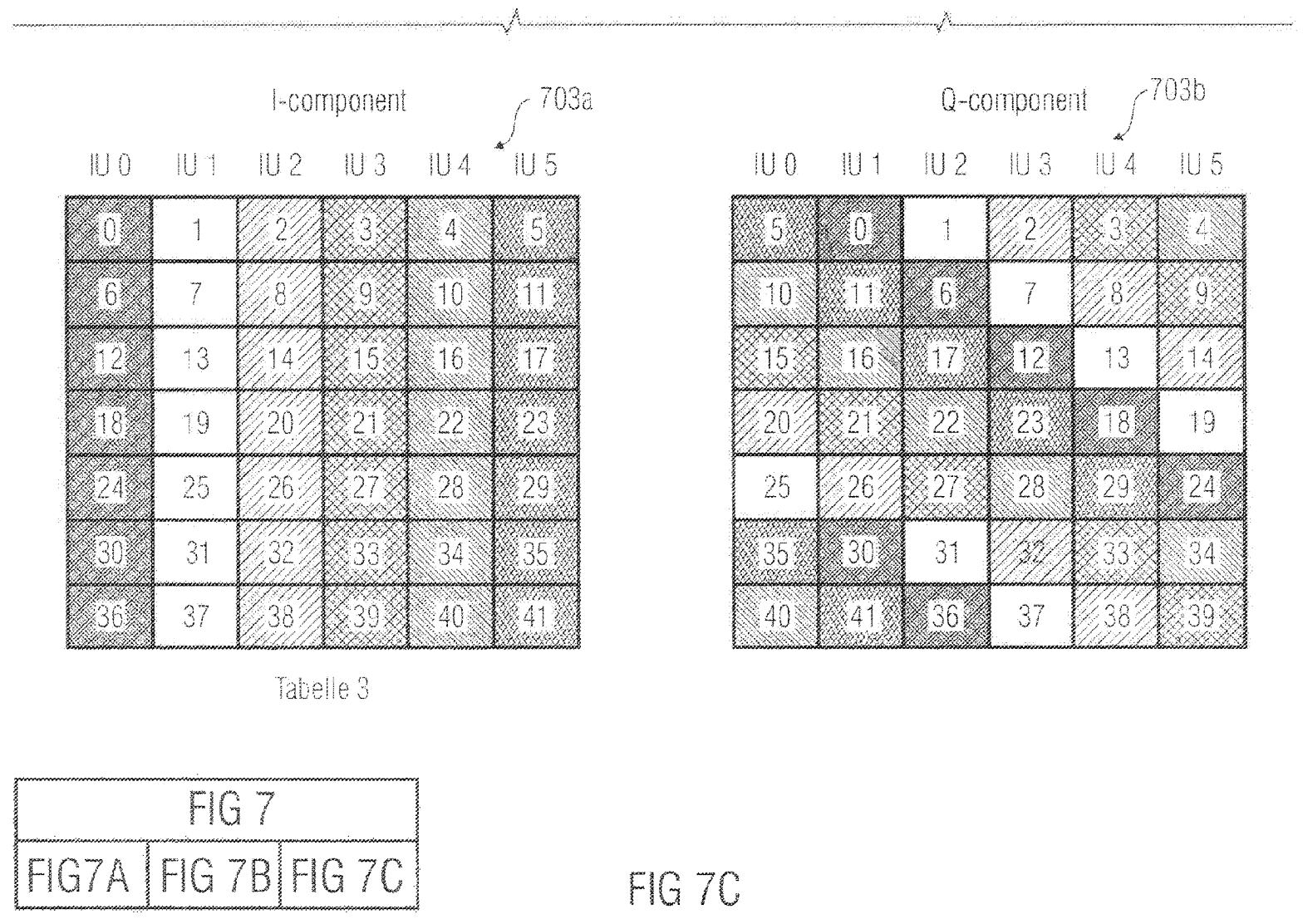

Subsequently, reference is made to FIGS. 7A-7C illustrating three different tables, where each table has an I component table and a Q component table. In the table 1 embodiment, the I- and Q component tables 701a and 701b are indicated. The tables are to be read so that the first pair in interleaving unit 0 (IU0) would be the I component of mapped symbol 0 and the Q component of mapped symbol 500. Exemplarily, the second pair in interleaving unit 4 would comprise the I component of mapped symbol 401 and the Q component of mapped symbol 201. In this embodiment, the distribution is systematic instead of pseudo-random. Here, the I-components of a FEC block are contiguously partitioned into the IUs 0 to M−1, when the interleaver has length M frames, see the example shown in Table 1. In this example, M=6 and there are 100 I-components per IU, i.e. 6001-components (or symbols) per FEC block. One may observe that each IU is transmitted in a different frame, as mentioned before. The shading in the table represents the IU index, which carries the 1-component of a symbol (e.g. dark for symbols 0, 1, 2 etc., because all their I-components are carried in IU 0). Now the Q-components are assigned to these IUs in a different manner.

While I0, the I-component of symbol 0, is in IU 0, the corresponding Q-component Q0 is in IU 1. I1, I2, I3, and I4 are all in IU 0, but their corresponding Q components Q1, Q2, Q3, and Q4 are in IU 2, IU 3, IU 4, and IU 5, resp. Next comes I5, which again is in IU 0. Now, the corresponding Q5 is in IU 1—just as Q0 is. Hence, the assignment pattern from Q0 to Q4 is cyclically repeated every 5 symbols for the first 100 symbols, whose O-component is located in IU 0.

A similar pattern, just cyclically shifted by one IU (one column), is used for symbols 100 to 199. This pattern is repeated in cyclically shifted versions for all other symbols of the FEC block, such that the picture of Table 1 appears.

Subsequently, a further embodiment is illustrated with respect to table 2 comprising an I component table 702a and a Q component table 702b. The notation is the same as discussed previously, i.e., that, for example, the first pair in IU0 would consist of the I component of mapped symbol 0 and the Q component of mapped symbol 500. The second pair in interleaving unit 0 would consist of the I component of mapped symbol 1 and the Q component of mapped symbol 501.

In FIG. 7B, items 702a, 702b, two consecutive symbols use the same assignment of their I- and Q-components to the IUs. Hence, not only symbol 0 has its I-component in IU 0 and its Q-component in IU 1, but the same assignment is used for symbol 1. Then the assigned IU for the O-component is cyclically shifted for the following symbols 2, 3, then for 4, 5 etc. until 99, similarly to the above example. For symbols 100 to 199, 200 to 299 etc., a cyclic shift of this assignment pattern by one IU is used.

Of course, this assignment pattern could be extended to have the same assignment to three, four etc. consecutive symbols instead of two.

FIG. 7C illustrates a further embodiment in connection with the I component table 703a and the Q component table 703b. However, the logic behind the table 3 embodiment is substantially different from the logic behind the table 1 and table 2 embodiments. Table 3 illustrates the first 42 symbols of an FEC block or codeword, indexed from 0 to 41.

The I-component is sequentially assigned to the IUs, i.e. symbol 0 to IU 0, symbol 1 to IU 1 etc. Then the O-components are assigned in the shown cyclic manner, which ensures that never I- and O-component are in the same IU. This procedure can be implemented by a shift register for the I components, which delays the I components by a specified number of symbols such as 6 symbols. The Q components are loaded in a further register, which is configured to implement an internal resorting after having received the specified number of Q components, such as six components. The internal resorting takes place in accordance with FIG. 7B, item 703b. Then the register is controlled to output the specified number (such as 6) Q components sequentially (together with the delayed I components). A further device distributes these cells one after the other to the specified number (such as 6) of interleaving units.

Note that the number of symbols associated with an ordered pair (k; m), where the symbol's I-component is in IU k and the O-component is in IU m, is not necessarily the same for all pairs (k; m). This depends on the number of symbols in a FEC block. E.g. if a FEC block contains only the 42 symbols shown in Table 3, then there are two symbols for the pair (0; 1), namely the one indexed by 0 and the one with 30, while there is only one symbol for (0; 4), namely index 18. Only if the FEC block length is a multiple of M*(M−1), this number is the same for all pairs (k; m). Otherwise, the number is "almost" constant, i.e. it varies by at most 1.

FIG. 8D illustrates a mathematical implementation of the cyclic Q delay illustrated in FIG. 7C, items 703a and 703b. In this interleaver controller implementation, which is mathematically expressed in FIG. 8D, the mapped symbol index is j and the number of the interleaving unit, in which the I component of this mapped symbol is to be placed is calculated by evaluating j mod M where M is the number of interleaving units.

Correspondingly, the Q component of this mapped symbol is distributed into an interleaver unit which is calculated by evaluating the expression 805 in FIG. 8D, where the function "floor" stands for "taking the lower nearest integer". Hence, the value "floor" of 6.1 or 6.9 would both be equal to 6.

FIG. 8E illustrates the functionality of FIG. 8D in an interleaver-like description. Again, the I component of the symbol j is to be interleaved or placed into a cell with an index to be calculated by evaluating expression 806. Similarly, the Q component of the symbol is to be interleaved into the cell with the cell to be determined by evaluating the expression 807 in FIG. 8E. The distribution of the cells into the interleaving units is indicated in item 808 of FIG. 8E. Hence, the cells represent all places for pairs of I and Q components throughout all interleaving units and, subsequent to the placement of the I and Q components in the cells or "pairs" of I and Q components within an interleaving unit, a further placement from the cells into the interleaving units takes place in accordance with the expression 808. Hence, the implementation in FIG. 8D can be seen as a direct translation of I and Q components into interleaving units and the implementation of FIG. 8E can be seen as a kind of an "indirect" implementation, where the cell index is first calculated and subsequently, the cells are placed into interleaving units.

The de-interleaver description that corresponds to the interleaver description of FIG. 8D or 8E are as follows.

With respect to the description in FIG. 8D, the following applies for the matching de-interleaver:

Sequentially take 1 cell from received IU 0, 1 cell from received IU 1, etc. This gives cells 0 to FEC block length −1. For each cell m: I component of received cell m is de-interleaved to column m mod M, Q component of received cell m is de-interleaved to column (m+M−1−floor (m/M) mod (M−1)) mod M.

After the de-interleaving, the de-interleaved cells of the FEC block are read row-by-row, i.e. 1 cell from column 0, 1 cell from column 1, etc.

With respect to the description in FIG. 8E, the following applies for the matching de-interleaver, i.e. the de-interleaver description would be based on:

de-interleave the I component of cell n to the symbol with index floor (n/N)+(n mod N)*M, where N=FEC block length/M de-interleave the Q component of cell n to the symbol with index (floor (n/N)+M−1−(n mod N) mod(M−1)) mod M+(n mod N)*M, where the IU k, with k from 0 to M−1, is composed of the cells with indices N*k+0 to N*k+(N−1). The de-interleaved symbols are output in the order of their index.

When the present invention is compared to the prior art illustrated in FIG. 11, it becomes clear that this new component interleaver or component de-interleaver replaces the combination of cyclic Q delay and cell interleaver, such that any extra cell interleaver is not required any more.

The implementation illustrated in the context of items 703a, 703b in FIG. 7C and illustrated in the context of FIG. 8D or 8E has a further significant advantage. The advantage is that this procedure allows the receiver to read larger bursts from an (external) memory (like IUs) without requiring an extra memory for all the cells of an FEC block. The prior art interleaver as well as implementations in accordance with Table 1, Table 2 need this extra memory because the receiver is to store the symbols of an FEC block after reversing the component interleaving and before feeding the symbols to the constellation de-rotation, the de-mapper, the bit de-interleaver, and the FEC decoder. In the FIGS. 8D and 8E embodiments, which is graphically illustrated at 703a and 703b in FIG. 7C, it is sufficient to load only the first parts of IUs 0-5 in order to reverse the component interleaving and feed these symbols to the demapper and bit de-interleaver, and it is not necessary to load the complete interleaving units 0-5. Exemplarily, a read unit of a de-interleaver could load the first five cells from each interleaving unit, i.e., the read unit discussed later on with respect to FIG. 9B would apply six bursts of five cells each, and then reverse the component interleaver. Then, these first 30 symbols would be forwarded to the de-rotation, demapping and bit de-interleaving block.

This approach is quite sufficient with respect to memory accesses (read only bursts from an external memory, not individual cells), but it necessitates only an extra memory of six times five cells for buffering these read bursts. Naturally, the burst size could be any number such as 16 instead of five cells.

Figure 9A:
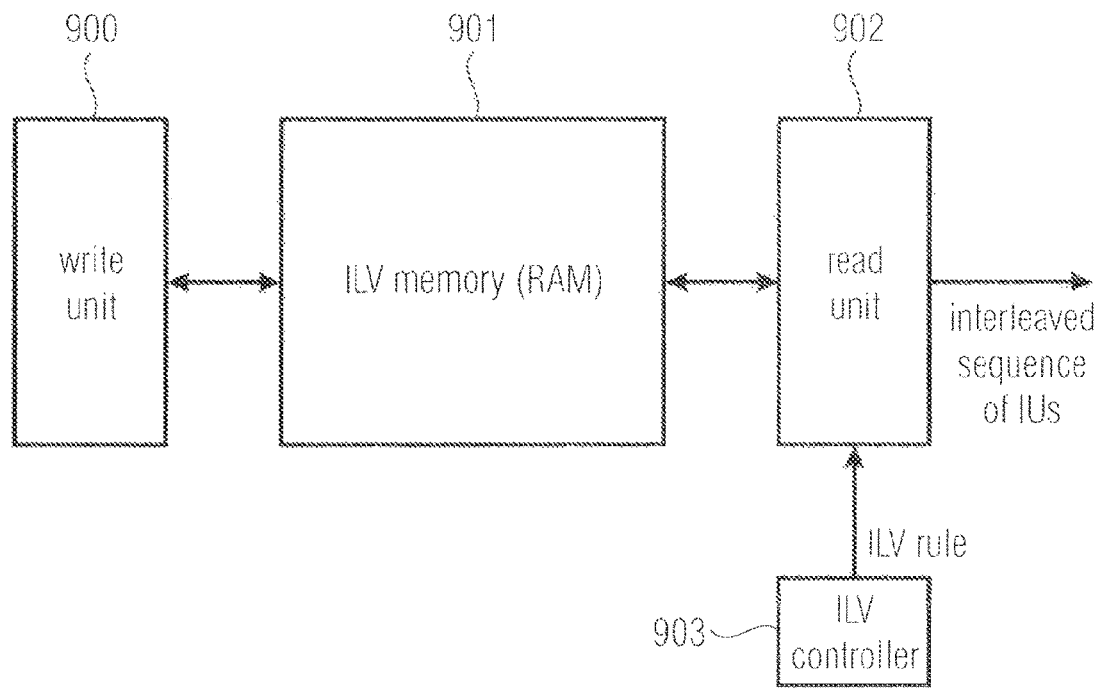
FIG. 9A illustrates details of a specific interleaver implementation.
Figure 9B:
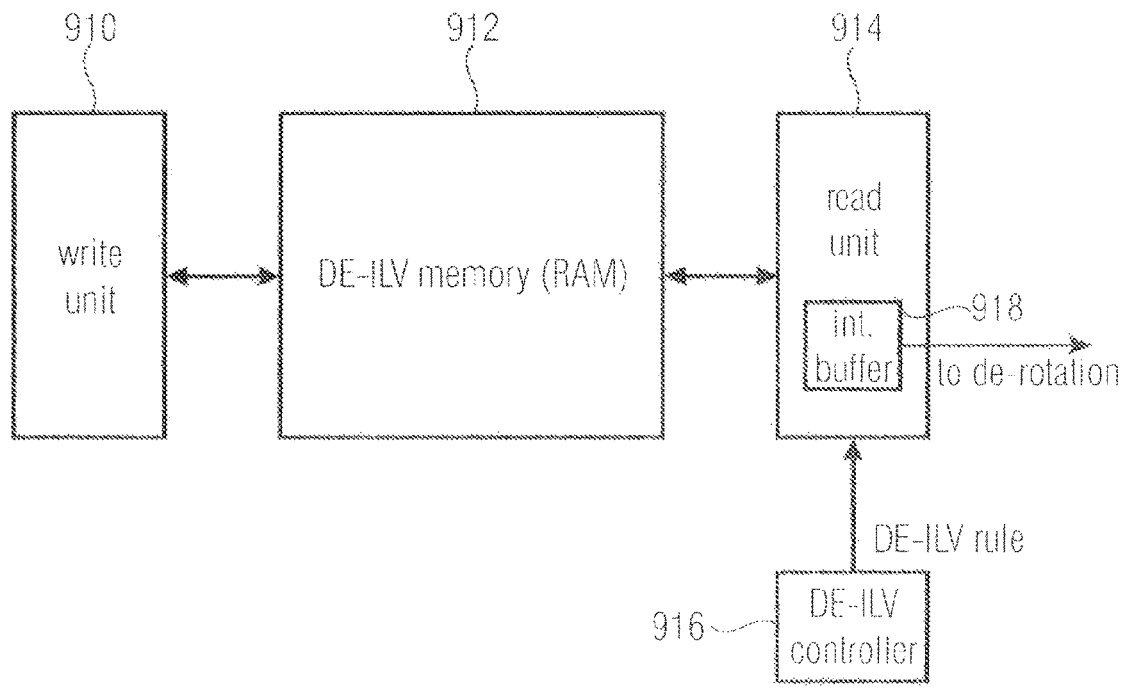
FIG. 9B illustrates details of a certain de-interleaver implementation.

FIGS. 9A and 9B illustrate a specific implementation of an interleaver in accordance with the present invention or a de-interleaver in accordance with the present invention. The interleaver comprises a write unit 900, a subsequently connected memory 901, which is the interleaver memory, and which can be implemented as an external random access memory (RAM), when the digital transmitter is implemented in a hardwired or semi-hardwired integrated circuit. The integrated circuit will then comprise the write unit 900 and a read unit 902 together with an interleaver controller 903. The interleaver controller 903 applies one of the exemplarily illustrated interleaving rules to the read unit 902, and the read unit 902 reads the memory 901, which has been provided with the mapped symbols in a certain order, so that the interleaved sequence of interleaving units output by the read unit 902 corresponds to the interleaver rule controlled by the interleaver controller 903. When, for example, the embodiment in Table 1, items 701*a*, 701*b* is considered, the implementation of the I component interleaving would be so that the write unit, for example, writes into the interleaver memory in a row-wise manner and there would be, for example, 100 columns and six rows. Then, the read unit 902 would read out the first row of the memory in order to obtain the I components of the first 100 mapped symbols for the first interleaving unit IU0 and, specifically, for the first components for interleaving unit 0. Then, the read unit would read the second row for obtaining the I components for the second interleaving unit IU 1, etc. Then, the read unit would read from the interleaver memory 901 in the order dictated by the first column of item 701*b* in FIG. 7A. The read unit would read from the memory where mapped symbol 500 is written. Then, the read unit would read from the memory where information unit 401 is placed. Then, the read unit would read from the memory where information unit 302 is placed, etc.

FIG. 9B illustrates a corresponding interleaver which, again, comprises a write unit 910, a de-interleaver memory such as an external RAM 912, a read unit 914, a de-interleaver controller 916 and an internal buffer 918 within the read unit 914. As in the FIG. 9A implementation, the read unit 914 includes the internal buffer 918 and the de-interleaver controller 916 may be part of an integrated circuit which is fully hardwired or semi-hardwired, while the de-interleaver memory 912 would be implemented as an external RAM. Now, when the FIG. 7C Table 3 embodiment is considered, it becomes clear that the read unit 914 can advantageously perform a row-wise burst readout. This is due to the fact that the tables in FIGS. 7A-7C illustrate the situation of the de-interleaver memory 912, when the interleaved data of a codeword has been received and written into the memory. Then, the memory would have, for example, six columns and, for example, 100 rows for the exemplary implementation as cited in FIGS. 7A-7C. Each place in the memory would be so that it can store an I component and a Q component. Then, the read unit 940 would simply read the first row of the memory and would receive, from this first row of the memory, all I and Q components for the first five mapped symbols. Then, these five mapped symbols simply can be forwarded to the de-rotation procedure and the internal memory 918 only has to store these five I components and the corresponding five Q components. The same is true for all the other rows, and, therefore, any intermediate storage apart from storing the I and Q components of a row is not required. Such a situation, however, would be necessitated when the embodiments of Table 1 and Table 2 are implemented and are read. It becomes clear from the Table 702*a* and 702*b* that a row-wise read operation from the memory does not result in consecutive mapped symbols to be further processed. Instead, if, for example, Table 2 is considered, it becomes clear that the first row-wise read operation results in mapped symbol 500 and mapped symbol 0 and a useful further processing of these mapped symbols is only possible when the intermediate information units 1-499 have also been de-interleaved. Hence, the internal buffer 918 can be made considerably small for the FIG. 7C items 703*a*, 703*b* embodiment.

In other words, embodiments of the present invention can be considered to comprise, on the sender side a component interleaver, which receives, as an input, (rotated) symbols of an FEC block and which provides, at an output, several interleaving units, which consist of cells, which are formed of I and Q components of the (rotated) symbols of an FEC block such that (a) the number of symbols, whose I components are interleaved to IU k and whose Q components are interleaved to IU n, are different by at most one for all pairs (k;m) with k not equal m, and where (b) the I component of a symbol is never interleaved to the same interleaving unit as the Q component of this symbol. In an embodiment, this procedure is performed together with rotated constellations, so that the symbols are rotated symbols.

In a further embodiment, this procedure is performed in the context of a time interleaver, so that the cells of a IU are transmitted close to each other with respect to time, while different IUs are transmitted separated from each other in time and one after the other.

In a further implementation, the assignment from the components of the mapped symbols to the interleaving units is based on a pseudo-random principle, where only favourable possibilities for distributing the I and Q components are employed.

In a further embodiment, the assignment is formed based on the procedure illustrated in the context of items 701*a*, 701*b* of FIG. 7A.

In a further embodiment, the assignment is performed based on the embodiment illustrated in the context of items 702*a*, 702*d* of FIG. 7B. In a further embodiment, the assignment is performed based on the implementation disclosed in the context of items 703*a*, 703*b* of FIG. 7C.

In a further embodiment, the assignment is performed based on the implementation in FIG. 8B or 8E.

The receiver is implemented correspondingly, where the receiver mirrors the corresponding transmitter implementation.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A transmitter for transmitting information, comprising:
a mapper for generating a plurality of mapped symbols, each mapped symbol comprising a first component and a second component, one of the first and second components being an in-phase component and the other of the first and second components being a quadrature component from a codeword; and
a component interleaver for generating a plurality of interleaving units to be transmitted in a time sequence, the plurality of interleaving units comprising at least three different interleaving units, wherein each of the plurality of interleaving units comprises a plurality of pairs of first and second components, the plurality of pairs being two or more, wherein the component interleaver is configured for assigning all first components and all second components of a codeword to the plurality of interleaving units in accordance with an interleaving rule, so that an I component of a mapped symbol and the Q component of the same mapped symbol are never assigned to one and the same interleaving unit, but to two different interleaving units.

2. The transmitter in accordance with claim 1, wherein the component interleaver is configured so that each favourable possibility occurs one or more times, wherein a favourable possibility is that the first and second components of the mapped symbols are distributed to different interleaving units.

3. The transmitter in accordance with claim 1, wherein the component interleaver is configured to assign all mapped symbols in a codeword to all different favourable possibilities, wherein a favourable possibility is that the first and second components of the mapped symbols are distributed to different interleaving units to distribute the first and second components of the mapped symbols to the interleaving units with a predetermined number of occurrences in a pseudo-random or deterministic manner and to distribute the first and second components in accordance with an assignment, wherein the assignment and the distribution of the first and second components take place mapped symbol by mapped symbol or wherein the mapped symbols are assigned before the first and second components of the mapped symbols are distributed.

4. The transmitter in accordance with claim 1, wherein the component interleaver is configured for performing an assignment as follows:
assign the first components of a codeword contiguously among the interleaving units; and
assign the second components of a codeword with a cyclic repetition of every $M*(M-1)$ mapped symbols to the different interleaving units, wherein M is the number of interleaving units for a codeword.

5. The transmitter in accordance with claim 4, wherein the second components are paired and the pairs of the second components are assigned to the interleaving units with a cyclic repetition of every $(M-1)$ mapped symbol.

6. The transmitter in accordance with claim 1, in which the component interleaver is configured for assigning the first and second components in accordance with an interleaving rule based on:
determining the interleaver unit for the first component of a symbol j as j mod M; and
determining the interleaver unit for the second component of a symbol j as $(\text{floor}(j/M) \bmod M-1)+1+j) \bmod M$, wherein mod is the modulo operation, where j is a number of a mapped symbol in a codeword, M is the number of interleaving units, and floor is a function rounding down to the nearest integer.

7. The transmitter in accordance with claim 1, in which the component interleaver is configured to interleave the I component of symbol j to the cell with index $(j \bmod M)*N+\text{floor}(j/M)$, where N=FEC block length/M, and to interleave the Q component of symbol j to the cell with index $((\text{floor}(j/M) \bmod (M-1)+1+j) \bmod M)*N+\text{floor}(j/M)$, wherein mod is the modulo operation, where j is a number of a mapped symbol in a codeword, M is the number of interleaving units, and floor is the function rounding down to the nearest integer.

8. The transmitter in accordance with claim 1, in which the mapper is configured for generating rotated mapped symbols in accordance with a rotated constellation mapping rule.

9. A receiver for receiving information, comprising: a receiver input stage for providing a codeword comprising a sequence of interleaving units, the codeword comprising interleaved mapped symbols, each mapped symbol comprising a first component and a second component, wherein one of the first and second components is an in-phase component and the other of the first and second components is a quadrature component, wherein the interleaved mapped symbols are interleaved such that all first components and all second components of a codeword have been interleaved in accordance with an interleaving rule so that the first component and the second component belonging to the same mapped symbol are never assigned to one and the same interleaving unit, but are assigned to different interleaving units, wherein each of the sequence of the interleaving units comprises a plurality of pairs of the first and second components;

a component de-interleaver for storing the codeword and for de-interleaving in accordance with the interleaving rule to acquire de-interleaved mapped symbols, each mapped symbol comprising the first component and the second component; and a decoder for decoding the de-interleaved mapped symbols to acquire a decoded information unit represented by the mapped symbols.

10. The receiver in accordance with claim 9, in which the component de-interleaver is configured to use the de-interleaving rule, so that a mapped symbol is never constructed from two components of the same interleaving unit, wherein there exist at least three interleaving units.

11. The receiver in accordance with claim 9, wherein the interleaving rule is so that each favourable possibility occurs, for a codeword, one or more times, wherein a favourable possibility is that the first and second components of the mapped symbols are distributed to different interleaving units, and wherein the component de-interleaver is configured to de-interleave in accordance with the interleaving rule.

12. The receiver in accordance with claim 9, wherein the interleaving rule is so that all mapped symbols in a codeword are assigned to all different favourable possibilities, wherein a favourable possibility is that the first and second components of the mapped symbols are in different interleaving units, the first and second components of the mapped symbols are distributed with a predetermined number of occurrences in a pseudo-random or deterministic manner, and the first and second components are distributed in accordance with an assignment, wherein the assignment and the distribution of the first and second components take place mapped symbol by mapped symbol or wherein the mapped symbols are assigned before the first and second components of the mapped symbols are distributed, and wherein the component de-interleaver is configured to de-interleave in accordance with the interleaving rule.

13. The receiver in accordance with claim 9, in which the component de-interleaver is configured to de-interleave based on the following de-interleaving rule:

de-interleave the I component of received interleaved mapped symbol n to the mapped symbol with index floor $(n/N)+(n \bmod N)*M$, where N=block length/M;

de-interleave the Q component of received interleaved mapped symbol n to the mapped symbol with index $(\text{floor } (n/N)+M-1-(n \bmod N) \bmod (M-1)) \bmod M+(n \bmod N)*M$;

where the IU k, with k from 0 to M−1, is composed of the received interleaved mapped symbols with indices $N*k+0$ to $N*k+(N-1)$ wherein IU is an interleaving unit; and output the de-interleaved mapped symbols in the order of their index, wherein mod is the modulo operation, where n is an index of a cell, and M is the number of interleaving units.

14. A method of transmitting information, comprising:

generating a plurality of mapped symbols, each mapped symbol comprising a first component and a second component, one of the first and second components being an in-phase component and the other of the first and second components being a quadrature component from a codeword; and generating a plurality of interleaving units to be transmitted in a time sequence, the plurality of interleaving units comprising at least three different interleaving units, wherein each of the plurality of interleaving units comprises a plurality of pairs of first and second components, the plurality of pairs being two or more, wherein the generating a plurality of interleaving units component interleaver assigns all first components and all second components of a codeword to the plurality of interleaving units in accordance with an interleaving rule, so that a I component of a mapped symbol and the Q component of the same mapped symbol are never assigned to one and the same interleaving unit, but to two different interleaving units.

15. A method of receiving information, comprising: providing a codeword comprising a sequence of interleaving units, the codeword comprising interleaved mapped symbols, each mapped symbol comprising a first component and a second component, wherein one of the first and second components is an in-phase component and the other of the first and second components is a quadrature component, wherein the interleaved mapped symbols are interleaved such that all first components and all second components of a codeword have been interleaved in accordance with an interleaving rule so that the first component and the second component belonging to the same mapped symbol are never assigned to one and the same interleaving unit, but are assigned to different interleaving units, wherein each of the sequence of the interleaving units comprises a plurality of pairs of the first and second components;

storing the codeword and de-interleaving in accordance with the interleaving rule to acquire de-interleaved mapped symbols, each mapped symbol comprising the first component and a second component; and decoding the de-interleaved mapped symbols to acquire a decoded information unit represented by the mapped symbols.

16. A non-transitory storage medium having stored thereon a computer program comprising a program code for performing, when running on a computer, a method in accordance with claim 14.

17. A non-transitory storage medium having stored thereon a computer program comprising a program code for performing, when running on a computer, a method in accordance with claim 15.

* * * * *